(12) United States Patent
Agrawal et al.

(10) Patent No.: US 8,843,548 B2
(45) Date of Patent: Sep. 23, 2014

(54) SYSTEM FOR PROVIDING INFORMATION AND INFORMATION EXPERTS TO A PLURALITY OF USERS

(75) Inventors: Purusharth Agrawal, Austin, TX (US); Todd Young, Austin, TX (US)

(73) Assignee: ProspX, Inc., Austin, TX (US)

( * ) Notice: Subject to any disclaimer, the term of this patent is extended or adjusted under 35 U.S.C. 154(b) by 170 days.

(21) Appl. No.: 13/476,611

(22) Filed: May 21, 2012

(65) Prior Publication Data

US 2012/0278274 A1   Nov. 1, 2012

Related U.S. Application Data

(63) Continuation-in-part of application No. 13/076,138, filed on Mar. 30, 2011.

(60) Provisional application No. 61/319,653, filed on Mar. 31, 2010.

(51) Int. Cl.
*G06F 15/16* (2006.01)
*G06Q 30/02* (2012.01)

(52) U.S. Cl.
CPC ............ *G06Q 30/02* (2013.01); *G06Q 30/0251* (2013.01)
USPC ........... 709/203; 709/201; 709/202; 709/204; 709/205

(58) Field of Classification Search
USPC ............................ 709/201, 202, 203, 204, 205
See application file for complete search history.

(56) References Cited

U.S. PATENT DOCUMENTS

| | | | |
|---|---|---|---|
| 6,055,570 A | 4/2000 | Nielsen | |
| 6,067,525 A | 5/2000 | Johnson et al. | |
| 6,850,896 B1 | 2/2005 | Kelman et al. | |
| 6,901,394 B2 * | 5/2005 | Chauhan et al. | 706/60 |
| 7,013,290 B2 | 3/2006 | Ananian | |
| 7,076,439 B1 | 7/2006 | Jaggi | |
| 7,130,879 B1 | 10/2006 | Dayon | |
| 7,197,716 B2 | 3/2007 | Newell et al. | |
| 7,249,026 B1 | 7/2007 | Bennett et al. | |
| 7,409,356 B1 | 8/2008 | Geddes et al. | |
| 7,516,088 B2 | 4/2009 | Johnson et al. | |
| 2004/0019494 A1 | 1/2004 | Ridgeway et al. | |
| 2005/0192870 A1 | 9/2005 | Geddes | |
| 2006/0015904 A1 | 1/2006 | Marcus | |
| 2006/0026033 A1 | 2/2006 | Brydon et al. | |
| 2008/0281610 A1 | 11/2008 | Yoshida et al. | |
| 2010/0223557 A1 * | 9/2010 | Kenney et al. | 715/736 |

FOREIGN PATENT DOCUMENTS

WO    WO 99/62010    12/1999

* cited by examiner

*Primary Examiner* — Liangche A Wang
*Assistant Examiner* — Cheikh Ndiaye
(74) *Attorney, Agent, or Firm* — Haynes and Boone, LLP

(57) ABSTRACT

A method to provide an information item and information expert to a user includes storing a first information item, task data, and a first expert identifier in a database. The task data includes a plurality of tasks and at least one attribute associated with each of the tasks. The first expert identifier identifies a first expert associated with the first information item and/or the first task. A task information update is created by associating the first information item with the first task in response to determining that it is related to the at least one attribute associated with the first task, and by providing the first expert identifier with the task information update in response to determining that it is associate with at least one of the first information item and the first task. Users that are associated with the first task are then provided the task information update.

17 Claims, 16 Drawing Sheets

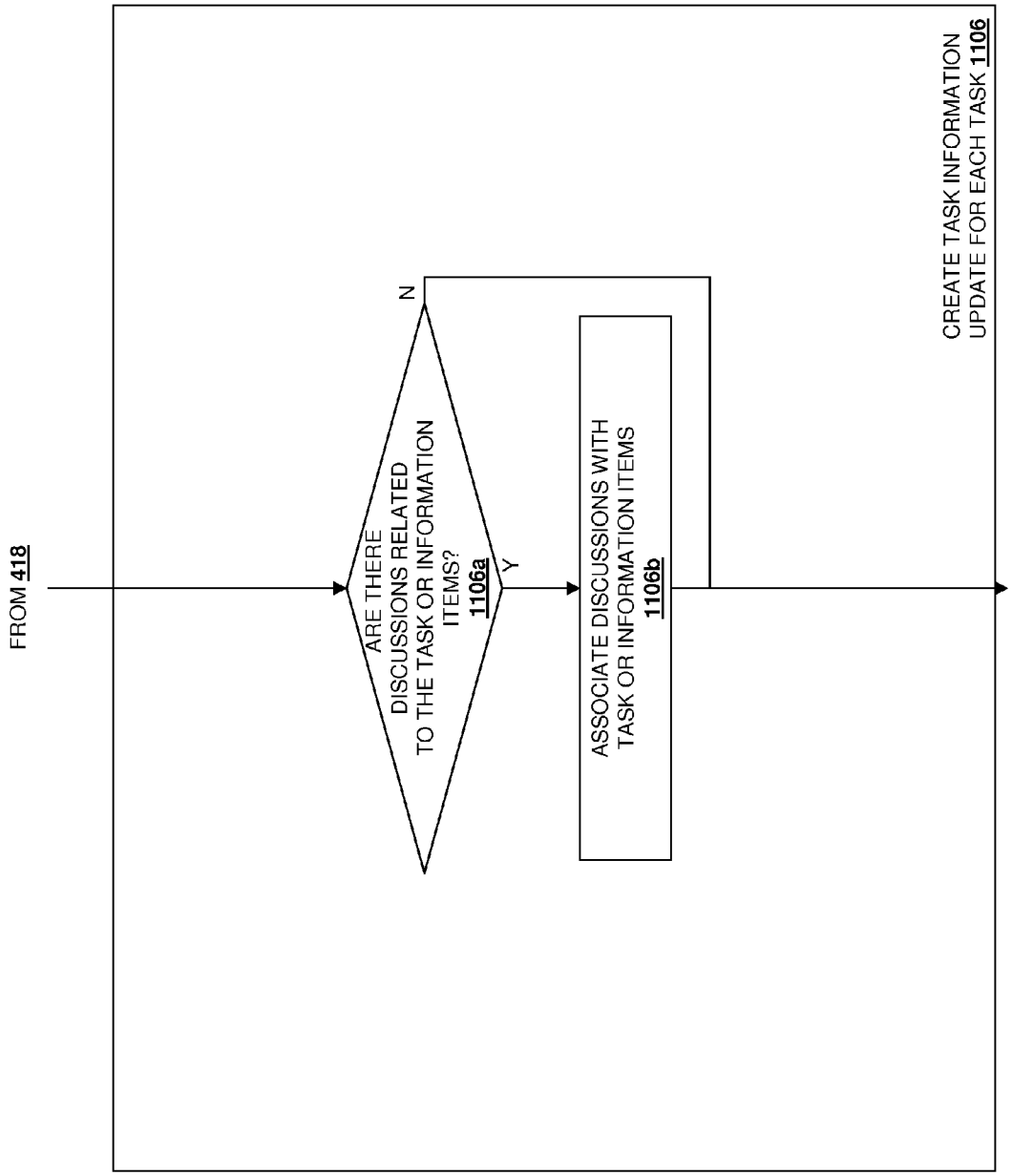

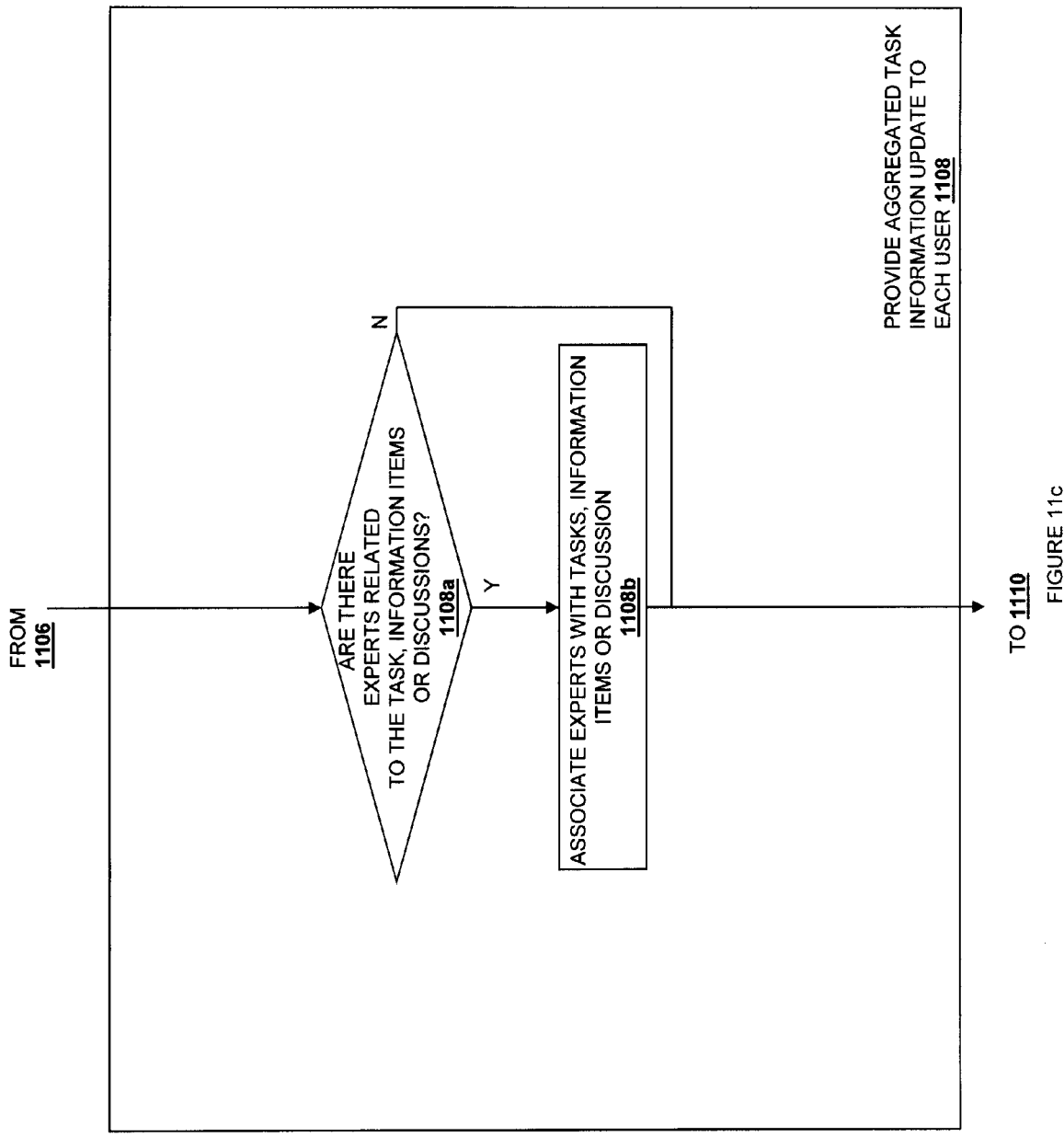

SYSTEM FOR PROVIDING INFORMATION AND INFORMATION EXPERTS TO A PLURALITY OF USERS

CROSS REFERENCE TO RELATED APPLICATIONS

The present application is a continuation-in-part of U.S. application Ser. No. 13/076,138, filed Mar. 30, 2011, which claims priority to U.S. Provisional Application Ser. No. 61/319,653, filed on Mar. 31, 2010, the disclosures of which are incorporated herein by reference in their entirety.

FIELD OF THE DISCLOSURE

Various embodiments of the disclosure pertain to a system and method to provide information and information experts to a plurality of users.

BACKGROUND

Conventional systems for providing information to users typically involve storing user identifications in a database, determining from the users the attributes of the types of information they would like to be provided, associating those attributes with the user identification in the database, and then using the attributes to provide the users information that the users would like to be provided. Users may then receive information feeds that include information related to the attributes of their choosing. However, such conventional systems often have attributes associated with the users that are no longer relevant to the users as a result of users neglecting to update the attributes in a timely fashion as their information needs change, and therefore provide the users with either information considered irrelevant or excessive by the users, to the point that the users may become overwhelmed and ignore the information or delete the information without reading it—consequently, important information may become lost in a sea of less important information.

Furthermore, conventional information provision systems leave it to users to research the information they are provided in order to determine which portions of that information are important to them and whether additional information should be retrieved based on their research. However, the majority of users in such systems do not spend time determining which portions of the information are important to them, developing questions about the information, and/or pursuing additional information.

Accordingly, it is desirable to provide an improved system and method for providing information and information experts to a plurality of users with an ability to better ensure that information provided to the users is consistently relevant to the users' current needs, to inform the users of which portions of the information may be particularly important to them, and provide the users with experts to discuss those or other portions of the information, all with minimal effort on the part of the users.

SUMMARY

Various embodiments of the present disclosure are directed to a method to provide an information item and an information expert to a user, the method including receiving a first information item through a network from an information provider and storing the first information item in an information database, receiving task data and storing the task data in a task database, wherein the task data includes a plurality of tasks, at least one attribute associated with each of the plurality of tasks, and a first task that is one of the plurality of tasks, storing a first expert identifier in an expert database, wherein the first expert identifier identifies a first expert that is associated with at least one of the first information item and the first task, creating a task information update by associating the first information item with the first task in response to determining that the first information item is related to the at least one attribute associated with the first task, and by associating the first expert identifier with the task information update in response to determining that the first expert is associate with at least one of the first information item and the first task, and providing, to a user through a user IHS over a network, the task information update in response to determining that the user is associated with the first task.

BRIEF DESCRIPTION OF THE DRAWINGS

FIG. 3b is a schematic view illustrating an embodiment of a user and information management engine used in the user group of FIG. 3a.

FIG. 11b is a flow chart illustrating an embodiment of a method to create task information updates in the method of FIG. 11a.

FIG. 11c is a flow chart illustrating an embodiment of a method to provide aggregated task information updates in the method of FIG. 11a.

DETAILED DESCRIPTION

Figure 1:
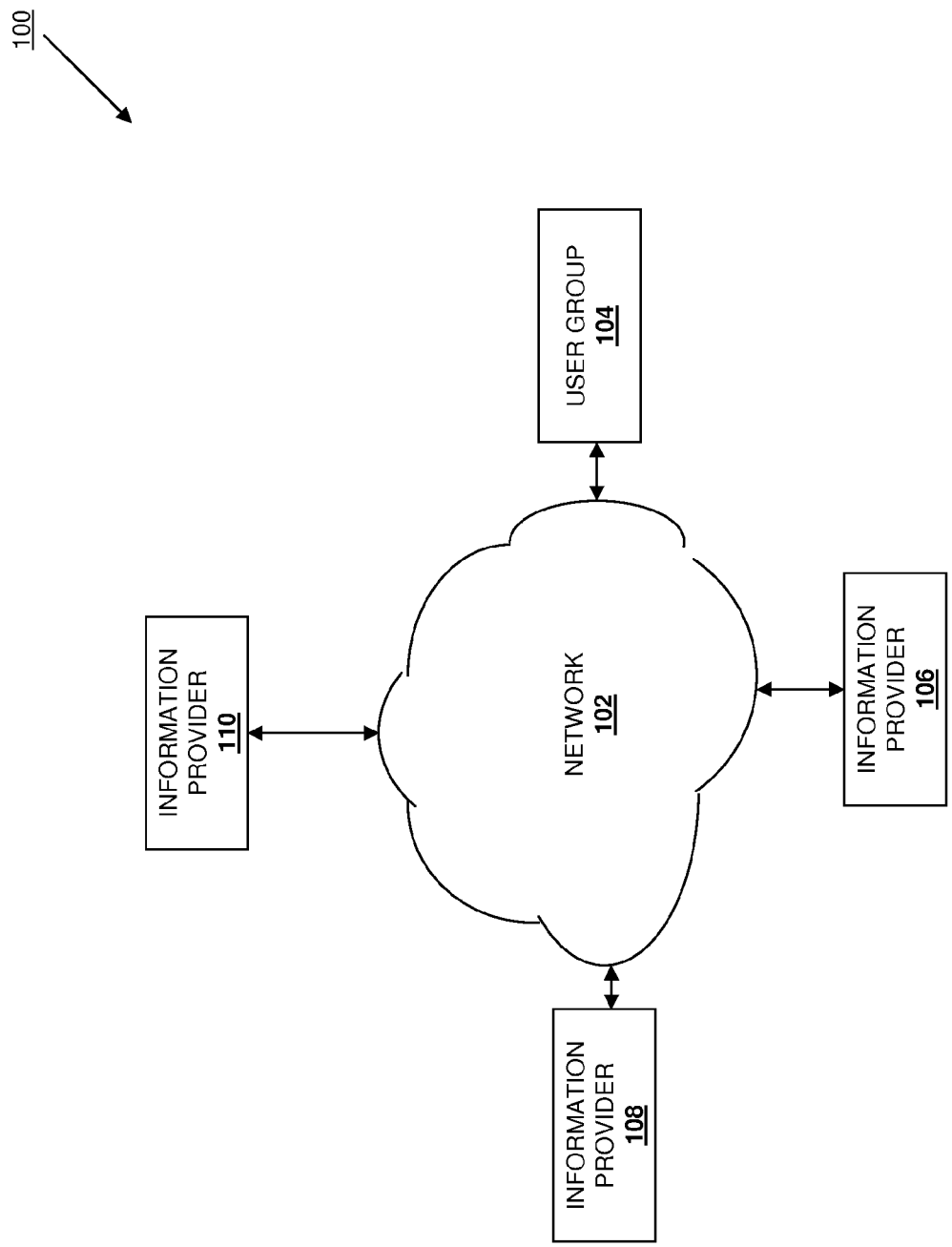
FIG. 1 is a schematic view illustrating an embodiment of a plurality of information providers and a user group coupled together through a network.

Referring now to FIG. 1, in one embodiment, a system 100 for transforming task information and providing the task information to a plurality of users is illustrated. The system 100 includes a network 102 such as, for example, a Transport Control Protocol/Internet Protocol (TCP/IP) network (e.g., the Internet or an intranet). A user group 104 is operably coupled to the network 102. A plurality of information providers 106, 108 and 110 are also operably coupled to the network 102 in order to allow communication between the information providers 106, 108 and 110 and the user group 104. In an embodiment, the user group 104 includes a group of salespersons, a group of lawyers, and/or a variety of other user groups known in the art. In an embodiment, the user group 104 includes a sales organization which includes a plurality of salespersons that sell products and/or services that may be provided or facilitated by the information providers 106, 108 and 110, as is discussed in further detail below. However, the user group 104 may also include a plurality of salespersons across different sales organizations. In an embodiment, the user group 104 includes a law firm which includes a plurality of lawyers that work on legal matters that may be related to information held by the information providers 106, 108 and 110, as is discussed in further detail below. However, the user group 104 may also include a plurality of lawyers across different law firms. In an embodiment, the user group 104 includes any group of users that uses information from the information providers 106, 108, and 110. In an embodiment, the information providers 106, 108 and 110 may be, for example, organizations offering products and/or services such as, for example, insurance products, insurance services, legal information, and/or a variety of other products and/or services known in the art.

Each of the user group 104 and the information providers 106, 108 and 110 includes a respective network interface for communicating with the network 102 (e.g., outputting information to, and receiving information from, the network 102), such as by transferring information (e.g., instructions, data, signals) between such information providers and the network 102. Accordingly, through the network 102, the user group 104 communicates with the information providers 106, 108 and 110, and the information providers 106, 108 and 110 communicate with the user group 104.

For clarity, FIG. 1 depicts only one user group 104. However, the system 100 may include a plurality of user groups. Likewise, for clarity, FIG. 1 depicts only three information providers 106, 108 and 110. However, the system 100 may include any plurality of information providers.

Each of the user group 104 and the information providers 106, 108 and 110 includes a respective IHS, a subsystem, or a part of a subsystem for executing processes and performing operations (e.g., processing or communicating information) in response thereto, as discussed further below. Each such IHS is formed by various electronic circuitry components. Moreover, as illustrated in FIG. 1, all such IHSs are coupled to each other through the network 102. For example, each information provider 106, 108, and/or 110 may include one or more provider IHSs, and each of the users in the user group 104 may include one or more user IHSs. Accordingly, the user group 104 and the information providers 106, 108 and 110 operate within the network 102 through the IHSs.

An IHS is an electronic device capable of processing, executing or otherwise handling information. Examples of an IHS include a server computer, a personal computer (e.g., a desktop computer or a portable computer such as, for example, a laptop computer), or a handheld computer.

Figure 2:
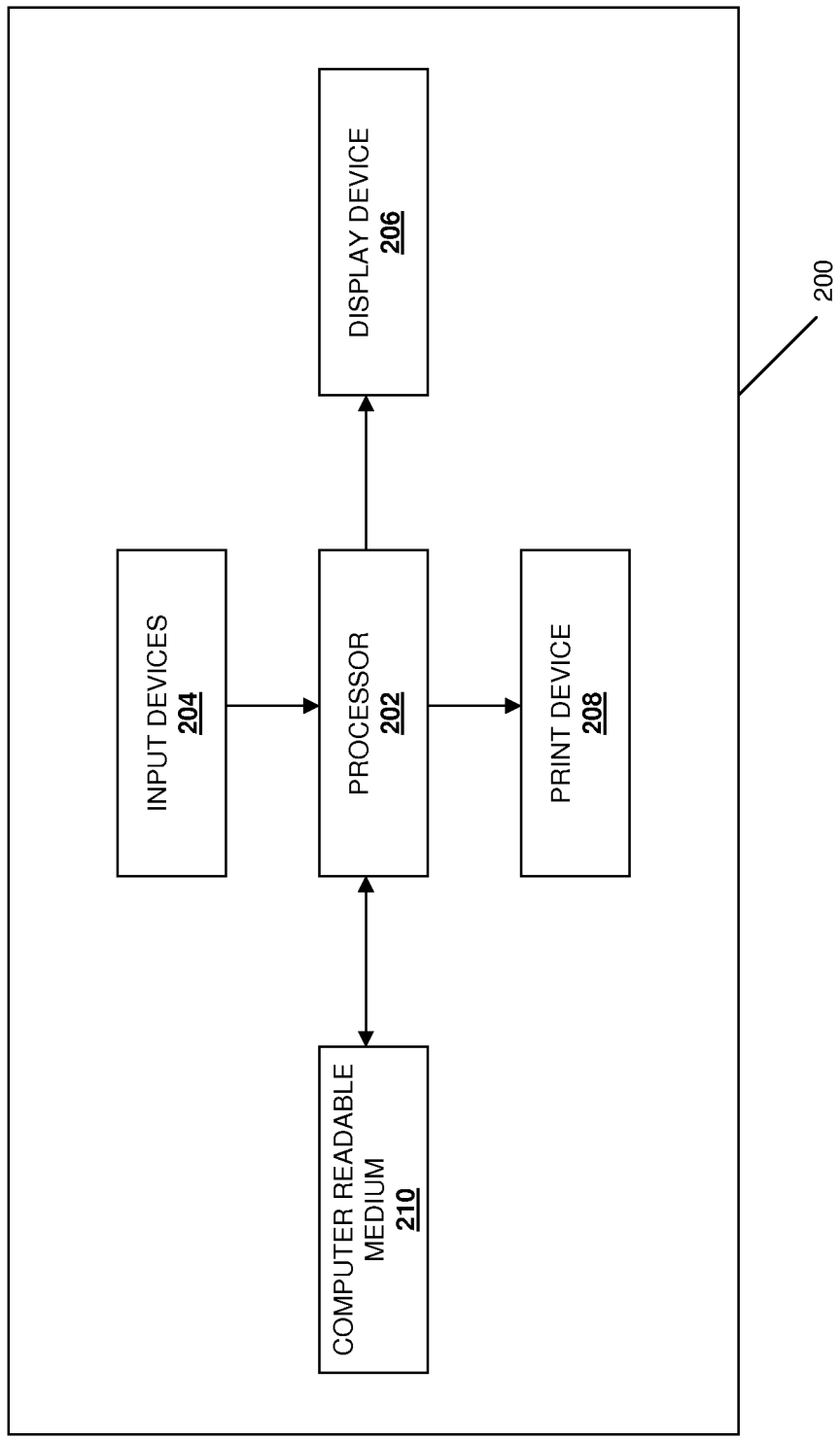
FIG. 2 is a schematic view illustrating an embodiment of an IHS used in the information providers and the user group of FIG. 1.

Referring now to FIG. 2, an IHS 200 which is representative of one of the IHSs described above, is illustrated. The IHS 200 may include any or all of the following: (a) a processor 202 for executing and otherwise processing instructions, (b) a plurality of input devices 204, which are operably coupled to the processor 202, for inputting information, (c) a display device 206 (e.g., a conventional electronic cathode ray tube (CRT) device or a conventional liquid crystal display (LCD)), which is operably coupled to the processor 202, for displaying information, (d) a print device 208 (e.g. a conventional electronic printer or plotter), which is operably coupled to the processor 202, for printing visual images (e.g., textual or graphic information on paper), scanning visual images, and/or faxing visual images, (e) a computer-readable medium 210, which is operably coupled to the processor 202, for storing information, as discussed further below, and (f) various other electronic circuitry for performing other operations of the IHS 200 known in the art.

For example, the IHS 200 may include (a) a network interface (e.g., circuitry) for communicating between the processor 202 and the network 102 and (b) a memory device (e.g., a random access memory (RAM) device or a read-only memory (ROM) device for storing information (e.g., instructions executed by processor 202 and data operated upon by processor 202 in response to such instructions)). Accordingly the processor 202 is operably coupled to the network 102, the input devices 204, the display device 206, the print device 208, and the computer-readable medium 210, as illustrated in FIG. 2.

For example, in response to signals from the processor 202, the display device 206 displays visual images. Information may be input to the processor 202 from the input devices 204, and the processor 202 may receive such information from the input devices 204. Also, in response to signals from the processor 202, the print device 208 may print visual images on paper, scan visual images, and/or fax visual images.

The input devices 204 include a variety of input devices known in the art such as, for example, a conventional electronic keyboard and a pointing device such as, for example, a conventional electronic mouse, trackball, or light pen. The keyboard may be operated to input alphanumeric text information to the processor 202, and the processor 202 may receive such alphanumeric text information from the keyboard. The pointing device may be operated to input cursor-control information to the processor 202, and the processor 202 may receive such cursor-control information from the pointing device.

The computer-readable medium 210 and the processor 202 are structurally and functionally interrelated with one another as described below in further detail. Each IHS of the illustrative embodiment is structurally and functionally interrelated with a respective computer-readable medium, similar to the manner in which the processor 202 is structurally and functionally interrelated with the computer-readable medium 210. In that regard, the computer-readable medium 210 is a representative one of such computer-readable media including, for example, but not limited to, a storage device.

The computer-readable medium 210 stores (e.g., encodes, records, or embodies) functional descriptive material (e.g., including but not limited to software (also referred to as computer programs or applications) or data structures). Such functional descriptive material imparts functionality when encoded on the computer-readable medium 210. Also, such functional descriptive material is structurally and functionally interrelated to the computer-readable medium 210.

With such functional descriptive material, data structures define structural and functional interrelationships between such data structures and the computer-readable medium 210 (and other aspects of the system 200). Such interrelationships permit the data structures' functionality to be realized. Also, within such functional descriptive material, computer programs define structural and functional interrelationships between such computer programs and the computer-readable medium 210 (and other aspects of the system 200). Such interrelationships permit the computer programs' functionality to be realized.

For example, the processor 202 reads (e.g., accesses or copies) such functional descriptive material from the computer-readable medium 210 onto the memory device of the IHS 200, and the IHS 200 (more particularly, the processor 202) performs its operations, as described elsewhere herein, in response to such material which is stored in the memory device of the IHS 200. More particularly, the processor 202 performs the operation of processing a computer application (that is stored, encoded, recorded, or embodied on a computer-readable medium) for causing the processor 202 to perform additional operations, as described elsewhere herein. Accordingly, such functional descriptive material exhibits a functional interrelationship with the way in which processor 202 executes its processes and performs its operations.

Further, the computer-readable medium 210 is an apparatus from which the computer application is accessible by the processor 202 for instructing the processor 202 to perform such additional operations. In addition to reading such functional descriptive material from the computer-readable medium 210, the processor 202 is capable of reading such functional descriptive material from (or through) the network 102. Moreover, the memory device of the IHS 200 is itself a computer-readable medium (or apparatus).

Figure 3A:
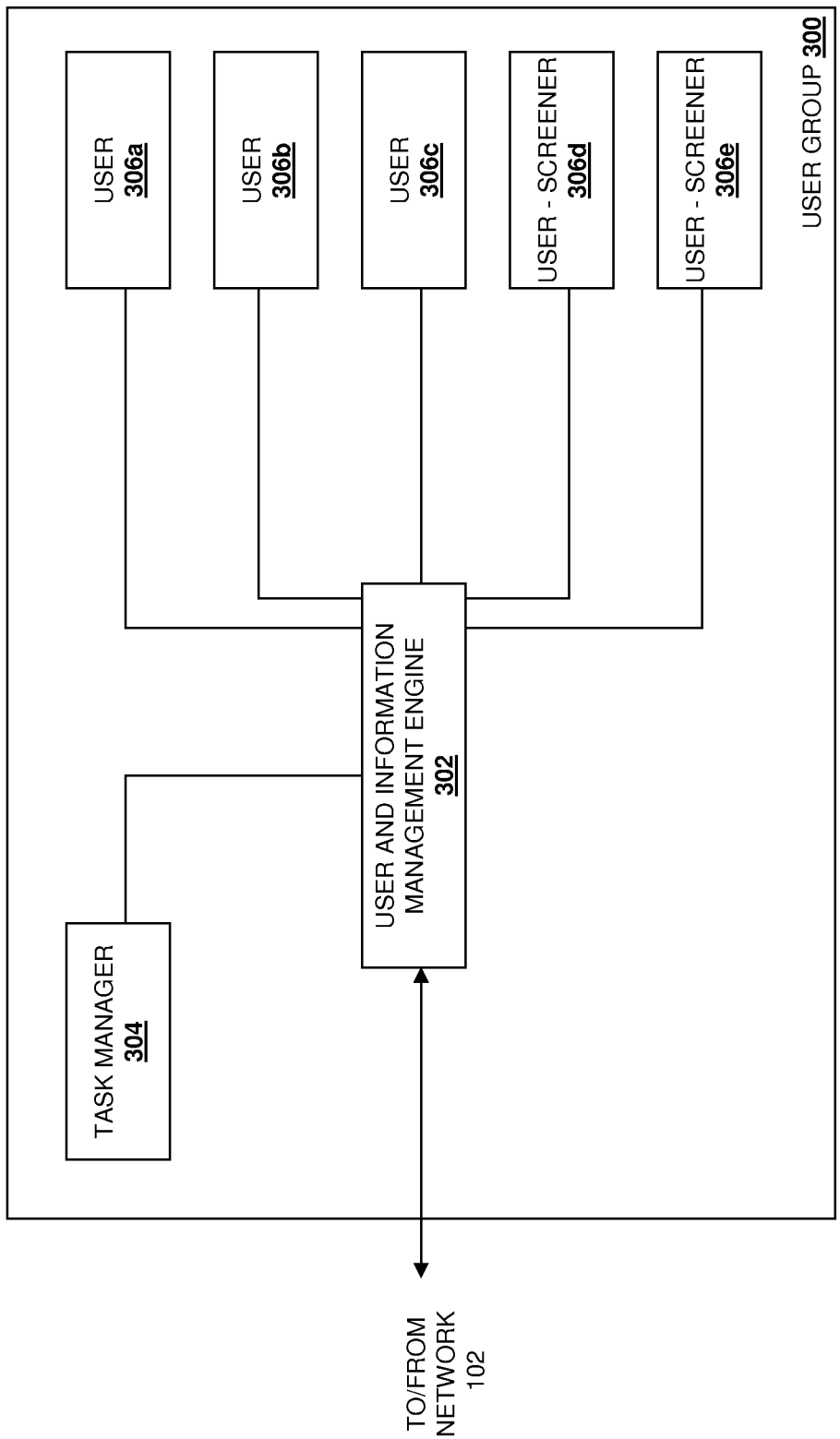
FIG. 3a is a schematic view illustrating an embodiment of the user group of FIG. 1.
Figure 3B:
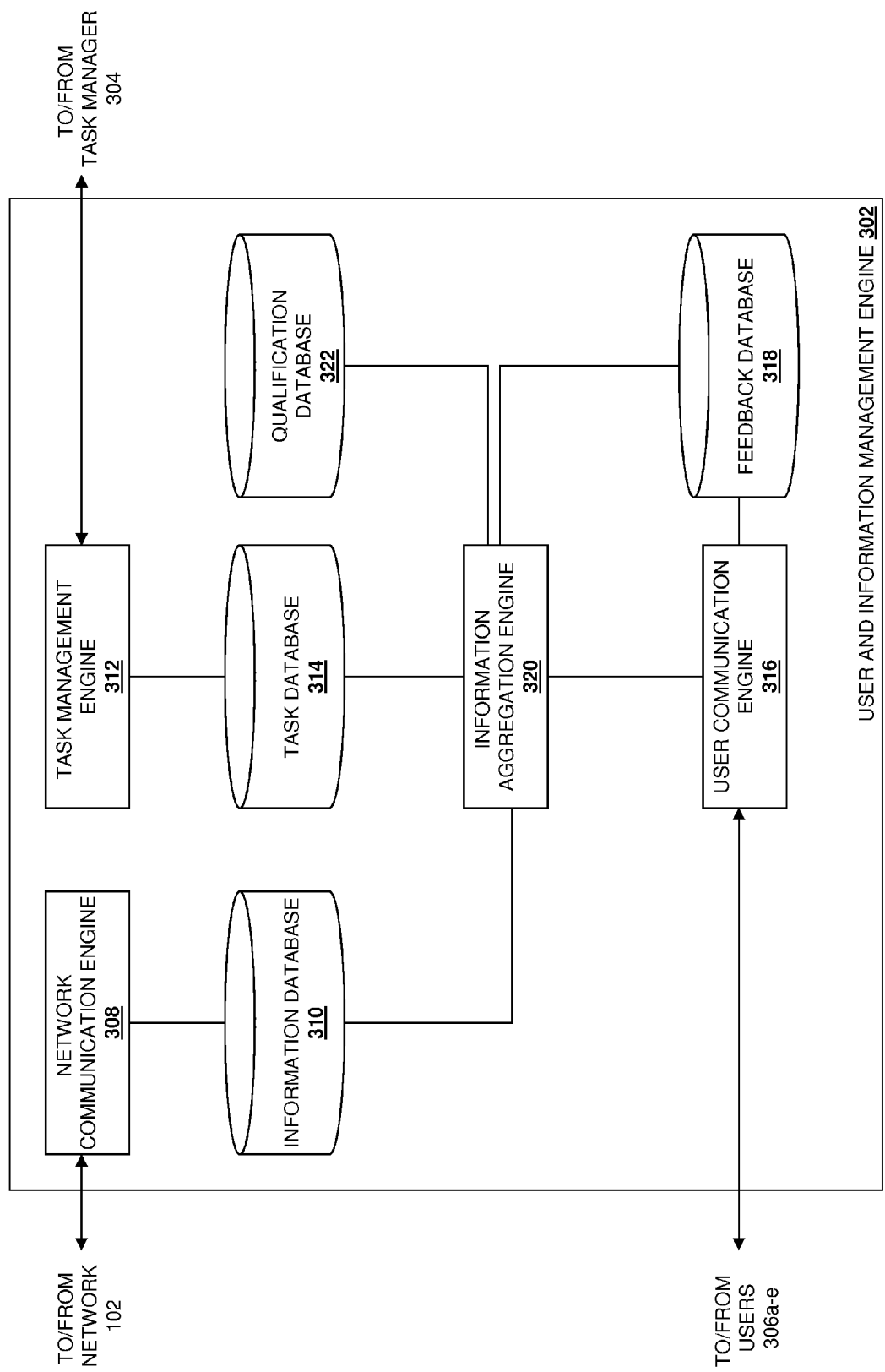
Figure 4:
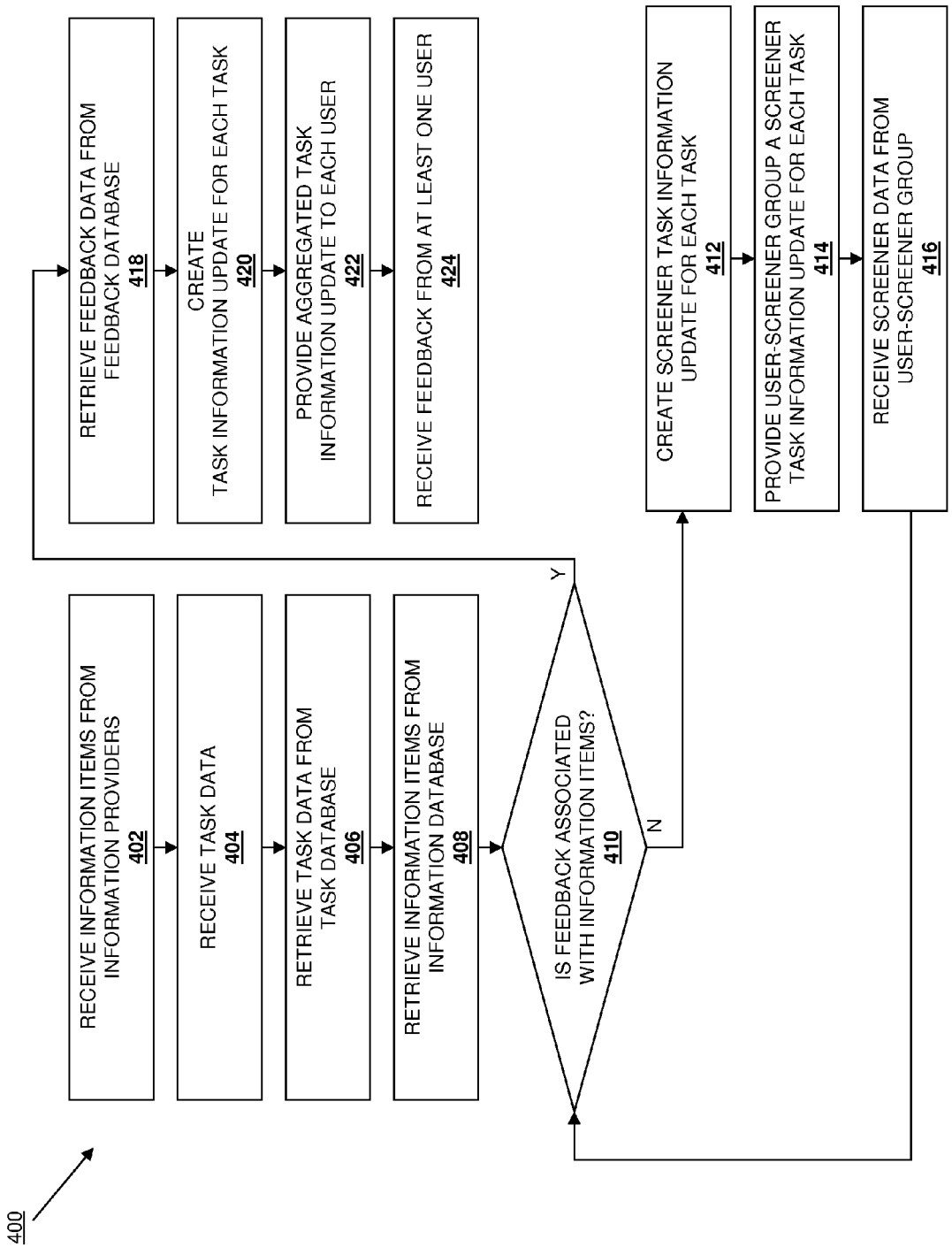
FIG. 4 is a flow chart illustrating an embodiment of a method to provide information to a user.

Referring now to FIGS. 1, 3a, and 3b, a user group 300, which may be the user group 104 described above with reference to FIG. 1, is illustrated in more detail. A user and information management engine 302 which may be, for example, software stored on the computer-readable medium 210 in the IHS 200, is included in the user group 300 and coupled to a network which may be, for example, the network 102. A task manager 304 is operably coupled to the user and information management engine 302. A plurality of users 306a, 306b, 306c, 306d, and 306e are operably coupled to the user and information management engine 302 and, in the illustrated embodiment, include users 306a, 306b, and 306c, and user-screeners 306d and 306e. In an embodiment, the task manager 304 is a manager of the users 306a-e that may determine the tasks assigned to the users 306a-e, as will be discussed in further detail below, and may include a task manager IHS that is operable to send information to the user and information management engine 302. In an embodiment, the users 306a-e may be salespeople, with user-screeners 306d and 306e that are a subset of the users 306a-e and that have been chosen to qualify and/or provide initial feedback for information items when those information items are initially provided to the system, as will be discussed in further detail below.

The user and information management engine 302 includes a network communication engine 308 which may be, for example, software stored on the computer-readable medium 210 in the IHS 200, and which is coupled to a network which may be, for example, the network 102, and to an information database 310. The user and information management engine 302 also includes a task management engine 312 which may be, for example, software stored on the computer-readable medium 210 in the IHS 200, and which is coupled to the task manager 304 and a task database 314. The user and information management engine 302 also includes a user communication engine 316 which may be, for example, software stored on the computer-readable medium 210 in the IHS 200, and which is coupled to the users 306a-e and to a feedback database 318. The user and information management engine 302 also includes an information aggregation engine 320 which may be, for example, software stored on the computer-readable medium 210 in the IHS 200, and which is coupled to the user communication engine 316, the information database 310, the task database 314, the feedback database 318, and a qualification database 322. In an embodiment, the information database 310, the task database 314, the feedback database 318, and the qualification database 322 are conventional databases known in the art. In an embodiment, the information database 310, the task database 314, the feedback database 318, and the qualification database 322 may be located outside the user and information management engine 302 and may still be operably coupled to the user and information management engine 302 and the engines 308, 312, 316, and 320. In an embodiment, the information database 310, the task database 314, the feedback database 318, and the qualification database 322 may all be included in a single database. In an embodiment, the information database 310, the task database 314, the feedback database 318, and the qualification database 322 each include a plurality of databases.

Referring now to FIGS. 1, 2, 3a, 3b, and 4, a method 400 to provide information items to a user is illustrated. The method 400 begins at step 402 where information is received from information providers. In an embodiment, the information providers 106, 108, and/or 110 may use provider IHSs to send information items through the network 102 to the user group 300. The network communication engine 308 in the user and information management engine 302 receives those information items and stores them in the information database 310. In an embodiment, the information items may include news alerts, notifications, product information, services information, company information, and/or a variety of other information that may be relevant to at least some of the users 306a-d in the user group 300. Furthermore, the information providers 106, 108, and/or 110 may provide details about some or all of the information items they send to the user group 300, and those details may be used to categorize the information item according to, for example, the company that the information item is pertinent to, a product the information item is pertinent to, a service the information item is pertinent to, and/or a variety of other information details known in the art. In an embodiment, information items stored in the information database 310 that were received without details may be reviewed by the user group 300 (e.g., the task manager 304, automated processes such as optical character recognition and/or keyword tagging, and/or a variety of other techniques known in the art) in order to create details for those information items such that they may be categorized. In an embodiment, the information aggregation engine 320 may access information items that were received and stored in the information database 310 and use techniques such as keyword searching in order to provide details for information items or supplement the details provided by, for example, connecting with a $3^{rd}$ party data research source or searching the qualification database 322 for details that may be associated with those information items (e.g., contacts known to exist in a company mentioned in the information item).

The method 400 then proceeds to block 404 where task data is received. In an embodiment, the task manager 304 may use a task manager IHS to send task data to the user and information management engine 302. In another embodiment, the users 306a-e may use user IHSs to send the task data to the user and information management engine 302. The task management engine 312 in the user and information management engine 302 receives the task data and stores it in the task database 314. In an embodiment, the task data includes a plurality of tasks, at least one attribute associated with each of the plurality of tasks, and users associated with each of the plurality of tasks. In an embodiment, a task may include a sales opportunity available to users in the user group 300, legal matters worked on by users in the user group 300, and/or a variety of tasks known in the art. In an embodiment, attributes associated with tasks may include the name of a company involved in a sales opportunity, people in the company who may facilitate a sales opportunity, the industry operated in by a company for which a sales opportunity exists, the size of a company for which a sales opportunity exists, a product being sold by a company for which a sales opportunity exists, and/or a variety of other sales opportunity attributes known in the art. In another embodiment, attributes associated with tasks may include an area of law associated with a legal matter, parties associated with a legal matter, and/or a variety of other legal matter attributes known in the art. In an embodiment, the information aggregation engine 320 may access the task data that was received and stored in the task database 314 and use techniques such as keyword searching in order to provide attributes for the tasks or supplement the attributes provided by, for example, connecting with a $3^{rd}$ party data research source or searching the qualification database 322 for attributes that may be associated with those tasks (e.g., known contacts for a sales opportunity, previous court opinions related to a legal matter, and/or a variety of other attributes known in the art).

Figure 5:
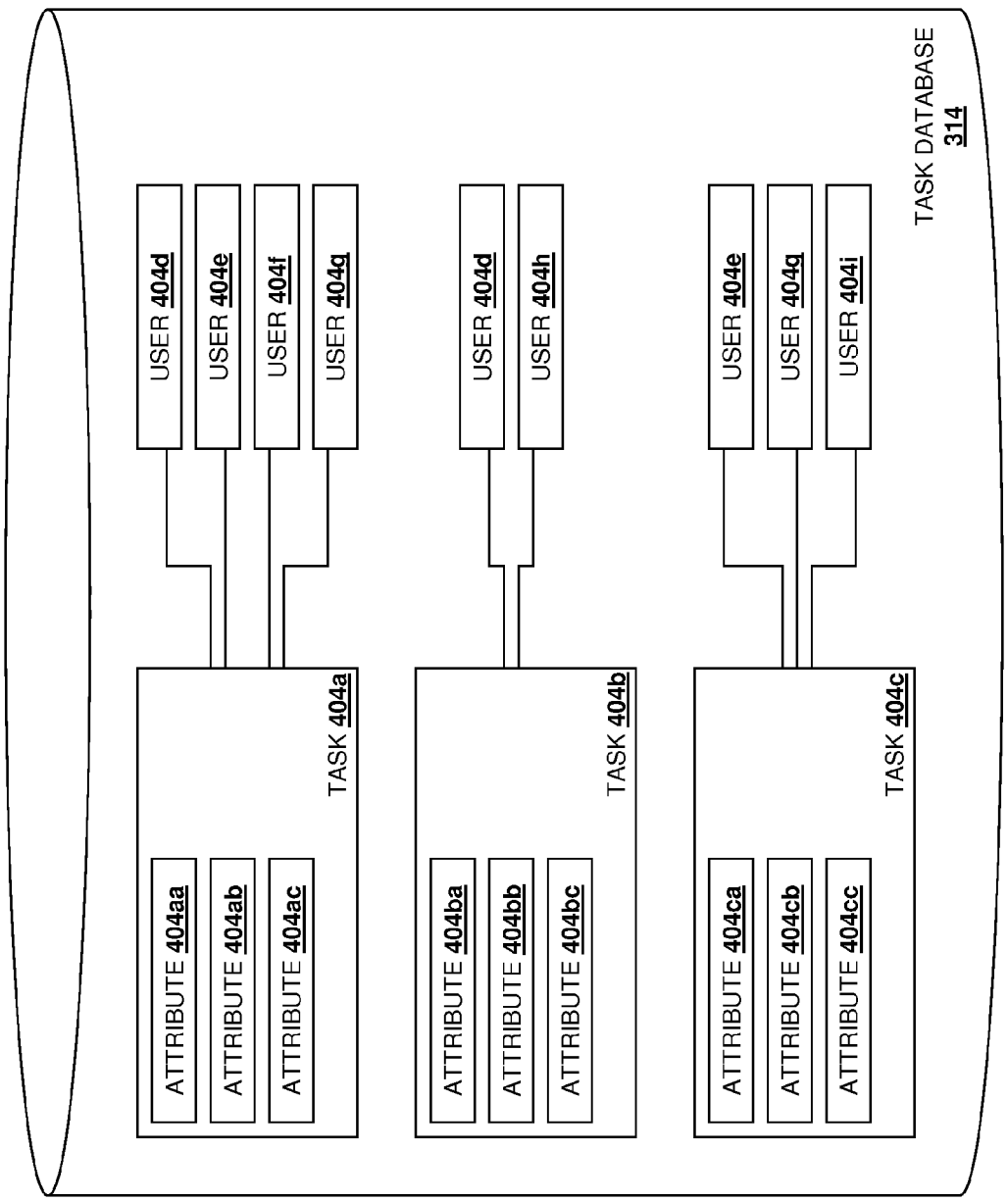
FIG. 5 is a schematic view illustrating an embodiment of a task database used in the user group of FIG. 1.

FIG. 5 is a schematic illustration of an embodiment of task data in the task database 314. The task data received in block 404 of the method 400 may organize a plurality of tasks 404a, 404b, and 404c. As can be seen, task 404a includes attributes 404aa, 404ab, and 404ac, task 404b includes attributes 404ba, 404bb, and 404bc, and task 404c includes attributes 404ca, 404cb, and 404cc. Furthermore, task 404a is associated with users 404d, 404e, 404f, and 404g, task 404b is associated with users 404d and 404h, and task 404c is associated with users 404e, 404g, and 404i (the users 404d, 404e, 404f, 404g, 404h, and/or 404i may be the users 306a-e, described above).

Figure 6:
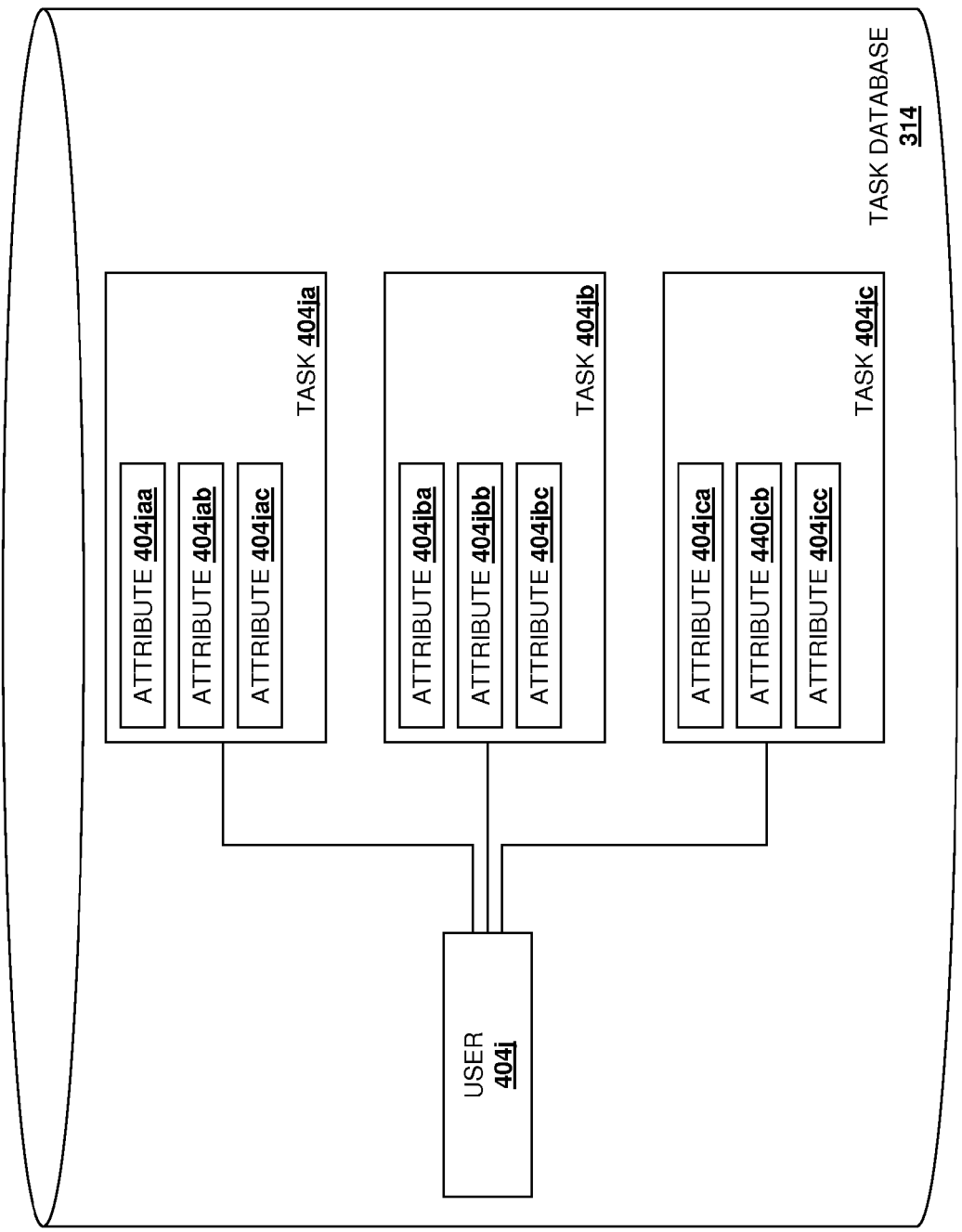
FIG. 6 is a schematic view illustrating an embodiment of a task database used in the user group of FIG. 1.

FIG. 6 is a schematic illustration of another embodiment of task data in the task database 314. The task data received in block 404 of the method 400 may organize a plurality of users such as, for example, user 404j, which may be any of the users 306a-e, described above. As can be seen, the user 404j is associated with a plurality of tasks 404ja, 404jb, and 404jc. Furthermore, task 404ja is associated with attributes 404jaa, 404jab, and 404jac, task 404jb is associated with attributes 404jba, 404jbb, and 404jbc, and task 404jc is associated with attributes 404jca, 404jcb, and 404jcc. While only one user 404j has been illustrated, one of skill in the art will recognize that any plurality of users may be associated with a plurality of tasks, with each task associated with attributes, in the same manner as described above with reference to FIG. 6.

Figure 7:
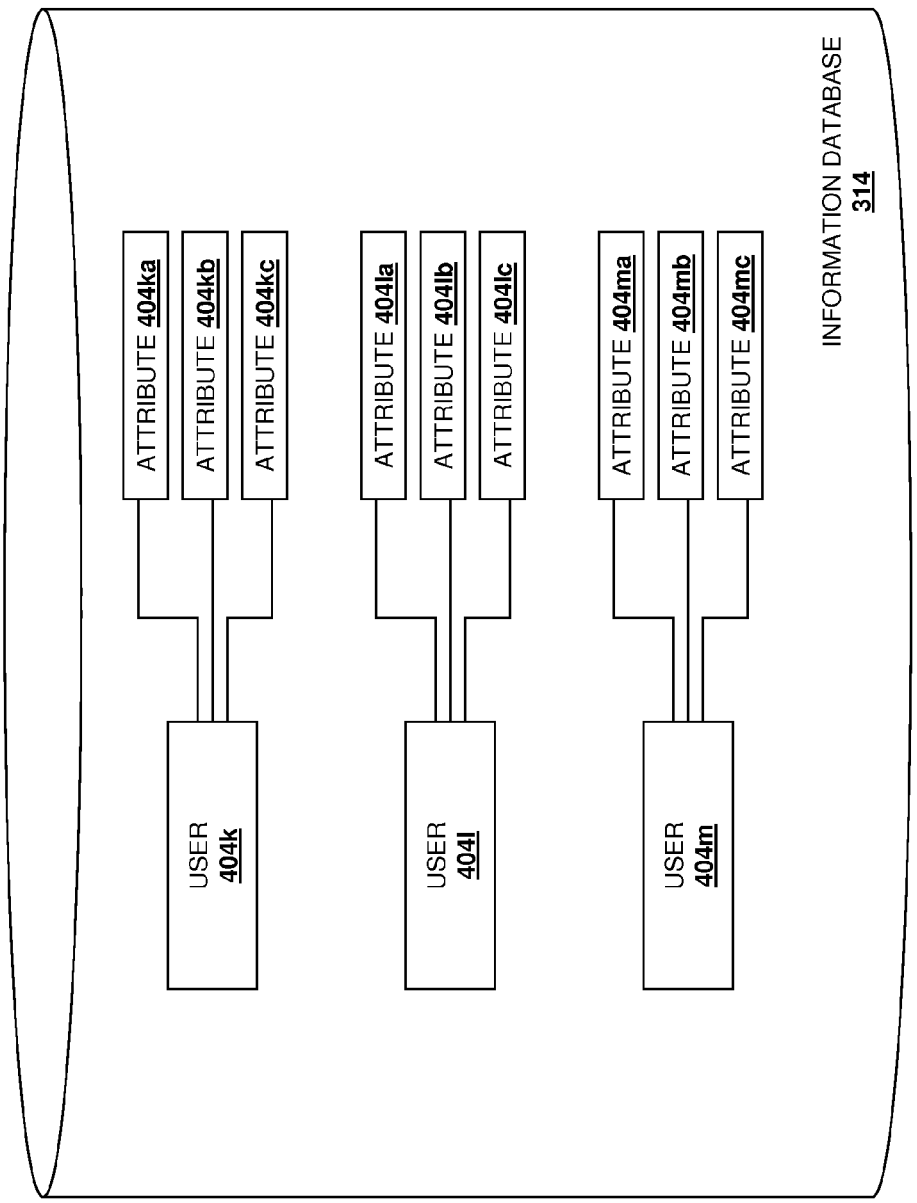
FIG. 7 is a schematic view illustrating an embodiment of a prior art information database.

FIG. 7 is a schematic illustration of an embodiment of a prior art information database that includes a plurality of users 404k, 404l, and 404m. The user 404k is associated with attributes 404ka, 404kb, and 404kc. The user 404l is associated with attributes 404la, 404lb, and 404lc. The user 404m is associated with attributes 404ma, 404mb, and 404mc. Traditionally, information would be provided to the users 404k, 404l, and 404m by matching attributes associated with a particular user with information items that are related to those attributes. In order to modify how information items are distributed in such a system, the attributes of each user must be modified. The task databases illustrated in FIGS. 5 and 6 provide an improvement over these traditional information databases by associating users with tasks that have attributes. While information item relevancy is determined by attribute, the attributes are associated with tasks rather than the users. Thus, in order to modify how information items are distributed in the system of the present disclosure, the task manager 304 (or other user of the method 400) may associate or disassociate users with tasks. For example, a salesperson user may be working on a specific task/sales opportunity and then may be removed from that task/sales opportunity. In order to prevent that salesperson user from receiving information items related to that task/sales opportunity, the salesperson user may be disassociated with the task/sales opportunity. Other salesperson users associated with that task/sales opportunity will continue to receive information items related to that task/sales opportunity. In another example, a task/sales opportunity may conclude. In order to prevent salesperson users from receiving information items related to that task/sales opportunity, the task/sales opportunity may be removed from the task database. In another example, a lawyer user may be working on a specific task/legal matter and then may be removed from that task/legal matter. In order to prevent that lawyer user from receiving information items related to that task/legal matter, the lawyer user may be disassociated with the task/legal matter. Other lawyer users associated with that task/legal matter will continue to receive information items related to that task/legal matter. In another example, a task/legal matter may conclude. In order to prevent lawyer users from receiving information items related to that task/legal matter, the task/legal matter may be removed from the task database. In an embodiment, other actions may be performed on the task data in the task database such as, for example, disassociating attributes and tasks, associating new users with tasks, and/or a variety of other actions known in the art. This and other benefits of the task data and task database 314 will be described in further detail below.

In an embodiment, blocks 402 and 404 of the method 400 result in the building up of information items in the information database 310 and task data in the task database 314 such that each user 306a-e is associated with one or more tasks and each of the tasks is associated with one or more attributes. The method 400 may then function to provide the information items to each of the users 306a-e as will be described in further detail below. For clarity of discussion, the method 400 will be described with respect to information items provided to particular users and user-screeners. However, one of skill in the art will recognize that the method 400 may operate to provide information items to any of the users 306a-e, all of the users 306a-e, or any other users in the user group 300 without departing from the scope of the present disclosure.

The method 400 then proceeds to block 406 where task data is retrieved from the task database 314. In an embodiment, the information aggregation engine 320 accesses the task database 314 and retrieves task data that may include a plurality of tasks, at least one attribute associated with each of the plurality of tasks, and at least one user associated with at least one of the plurality of tasks. The method 400 then proceeds to block 408 where information items are retrieved from the information database 310. In an embodiment, the information aggregation engine 320 accesses the information database 310 and retrieves at least one information item. In an embodiment, the information items retrieved at block 408 of the method 400 may include information items received at block 402 of the method 400 and/or information items received in previous uses of the method 400. The method 400 then proceeds to decision block 410 where it is determined whether feedback is associated with the information items retrieved in block 408. The information aggregation engine 320 accesses the feedback database 318 and searches the feedback database 318 for feedback associated with the information items retrieved in block 408. In an embodiment, feedback associated with the information items retrieved in block 408 may be feedback for information items that were received prior to block 402 of the method 400 and provided to users previously (i.e., during a prior use of the method 400).

If at decision block 410 the method 400 determines that there is no feedback for an information item, the method 400 proceeds to block 412 where a screener task information update is created for each task. The information aggregation engine 320 determines the information items, retrieved in block 408 of the method 400, that should be associated with the tasks retrieved in block 406 of the method 400 by, for example, using the details associated with the information items and the attributes associated with the tasks to determine the information items that are related to the attributes of a particular task and hence provide useful information about that task. In this manner, one or more information items may be associated with each task and a screener task information update may be created for each task that includes that task and information items that are associated with that task. For example, a detail associated with an information item may include a company name and an attribute of a task may include the same company name, and at block 412 that information item may be associated with that task due to the detail of the information item being related to the attribute of the task (i.e., they include the same company name). Each screener task information update may then include a task and all the information items associated with that task, at least one of those information items being an information item that has no feedback associated with it. In an embodiment, some information items may be related to more attributes of a given task than other information items, and those information items may be ranked or prioritized over the information items that are related to less attributes of the task. In an embodiment, a screener task information update for a given task may include information items with feedback (described in further detail below) as well as information items without feedback, and those information items without feedback may be highlighted or otherwise distinguished from the information items with feedback.

The method 400 then proceeds to block 414 where a user-screener group is provided a screener task information update for each task. The information aggregation engine 320 searches through all the user-screeners in the user group 300 and determines a user-screener group that includes a plurality of user-screeners (e.g., user-screeners 306d and 306e) that are associated with the tasks that are associated with the information items for which it was determined there was no feedback in decision block 410. The information aggregation engine 320 then provides the user communication engine 316 the screener task information updates for each user-screener 306d and 306e. The user communication engine 316 then provides, through, for example, a screener IHS that receives the screener task information update(s), each user screener 306d and 306e the screener task information updates that include the tasks that user-screener is associated with. In an embodiment, the screener task information updates may be included with other task information updates (described in further detail below) in an aggregated task information update for a user (described in further detail below). In an embodiment, the user-screeners 306d and 306e may be provided one or more screener task information updates through a single email from the user communication engine 316 that includes an aggregated task information update having a plurality of screener task information updates and/or a plurality of regular task information updates. The single email may be provided on a set schedule (e.g., weekly, bi-weekly, monthly, etc.) chosen by the user, the task manager, or other entity. In an embodiment, the user-screeners 306d and 306e may be provided an aggregated task information update having a plurality of screener task information updates and/or a plurality of regular task information updates on a website that is updated by the user communication engine 316.

The method 400 then proceeds to block 416 where screener data is received from the user-screener group. After receiving the screener task information updates in block 414 of the method 400, the user-screeners 306d and 306e may review each task and the information items associated with those tasks. For each information item, the user-screener 306d and 306e may provide screener data (i.e., feedback from the user-screeners for the information items) through, for example, a screener IHS, to the user communication engine 316, which then stores that screener data in the feedback database 318 as feedback. In an embodiment, the screener data may be positive feedback to indicate, for example, that an information item is good and/or relevant to the task is it associated with. In an embodiment, positive feedback that indicates that an information item is good and/or relevant to the task is it associated with may result in positive feedback for the information provider that provided that information item. In an embodiment, the screener data may be negative feedback to indicate, for example, that an information item is not good and/or relevant to the task is it associated with. In an embodiment, negative feedback that indicates that an information item is not good and/or relevant to the task is it associated with may result in negative feedback for the information provider that provided that information item. In an embodiment, the positive and/or negative feedback may result in prioritization or de-prioritization of an information item relative to another information item or for an information provider relative to another information provider. For example, for multiple information items associated with a given task, information items with more positive feedback will be prioritized over information items with less positive or negative feedback, and information items from information providers that have more positive feedback will be prioritized over information items from information providers that have less positive or negative feedback. In addition, if an information item and/or information provider receives a predetermined amount of negative feedback, that information provider may be restricted from submitting information items to the user group 300. In this manner, information providers may develop 'feedback reputations' that may be used to prioritize and de-prioritize information items associated with a task. Thus, blocks 412, 414, and 416 of the method 400 provide feedback (i.e., screener data) for information items that have yet to receive feedback. In an embodiment, the user-screeners may be selected for the user-screener group in response to determining their accuracy and/or willingness to provide relevant feedback for information items. The method 400 then returns to block 410.

If at decision block 410 the method 400 determines that there is feedback for an information item, the method 400 proceeds to block 418 where feedback data from the feedback database 318 is retrieved. As described above, in an embodiment, the feedback data associated with the information items retrieved in block 408 may be feedback data for information items that were received prior to block 402 of the method 400 and provided to users previously (i.e., during a prior use of the method 400). In an embodiment, the feedback associated with the information items retrieved in block 408 may be screener data for information items that were received in block 402 of the method 400 or previously (i.e., during a prior use of the method 400). The method 400 then proceeds to block 420 where an task information update for each task is created. The information aggregation engine 320 determines which of the information items retrieved in block 408 of the method 400 should be associated with the plurality of tasks retrieved in block 406 of the method 400 by, for example, using the details associated with the information items and the attributes associated with the tasks to determine the information items that are related to the attributes of a particular task and hence provide useful information about that task. In this manner, one or more information items may be associated with each task and a task information update may be created for each task that includes that task and information items that are associated with that task. For example, a detail associated with an information item may include a company name and an attribute of a task may include the same company name, and at block 420 that information item may be associated with that task due to the detail of the information item being related to the attribute of the task (i.e., they include the same company name). Each task information update may then include a task and all the information items associated with that task. The information items for the task in each task information update may then be prioritized. In an embodiment, the feedback data and/or the screener data retrieved from the feedback database 318 may be used to prioritize the information items for the task in each task information update. The feedback data and screener data may include a ranking provided by users and/or user-screeners that may include a 'positive' ranking, a 'neutral' ranking, a 'negative' ranking, a numerical ranking on a predetermined scale, and/or a variety of other rankings known in the art. The information aggregation engine 320 may use an algorithm to weigh the feedback data and the screener data, as well as other data associated with the information items and information providers, in order to prioritize the information items for a task in a task information update relative to each other such that highly regarded and task relevant information items take priority over information items that are lowly regarded and not as task relevant.

The method 400 then proceeds to block 422 where aggregated task information updates are provided to each user. For each user (e.g., the user 306a) in the user group 300, the information aggregation engine 320 may determine which tasks are associated with that user (or, in an alternative embodiment, for each task, the information aggregation engine 320 may determine which users are associated with that task). The information aggregation engine 320 then retrieves each task information update created in block 422 of the method 400 that corresponds to the tasks associated with that user and creates an aggregated task information update that may includes a plurality of task information updates for the tasks that are associated for that user. The information aggregation engine 320 then provides the user communication engine 316 the aggregated task information update created for each user. The user communication engine 316 then provides, through, for example, a user IHS that receives the aggregated task information update(s), each user the aggregated task information update that was created for them and that includes the tasks that they are associated with. In an embodiment, the user may be provided the aggregated task information update through a single email from the user communication engine 316. The single email may be provided on a set schedule (e.g., weekly, bi-weekly, monthly, etc.) chosen by the user, the task manager, or other entity. In an embodiment, the users may be provided the aggregated task information update on a website that is updated by the user communication engine 316.

Figure 8:
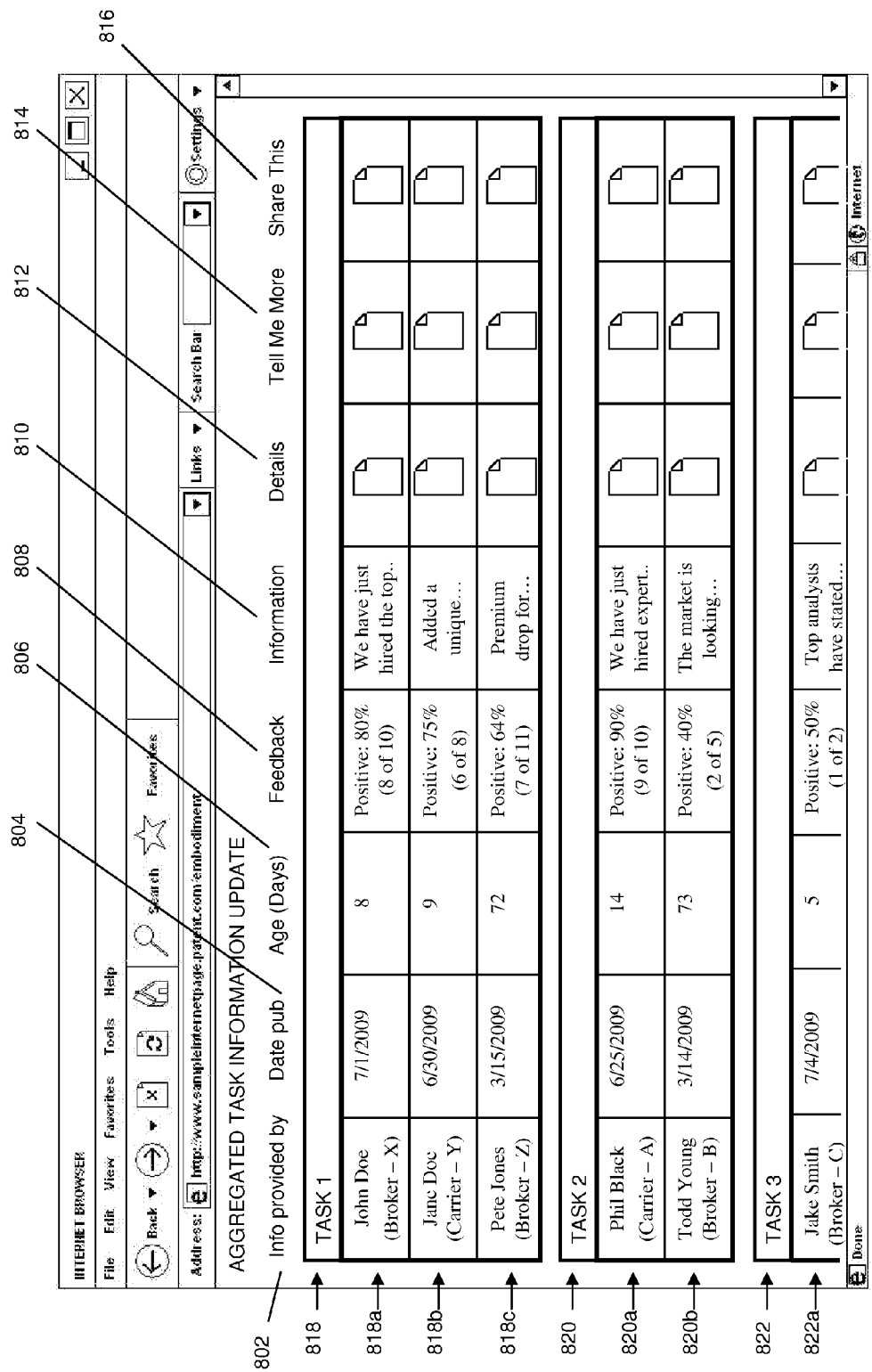
FIG. 8 is a screenshot illustrating an embodiment of an aggregated task information update.

For example, FIG. 8 illustrates an aggregated task information update 800 provided to a user through a website updated by the user communication engine 316. One of skill in the art will recognize that the aggregated task information update 800 may be provided in a single email without departing from the scope of the present disclosure. The aggregated task information update 800 includes a plurality of headings including an 'info provided by' heading 802, a 'date published' heading 804, an 'age' heading 806, an 'information' heading 808, a 'details' heading 812, a 'tell me more' heading 814, and a 'share this' heading 816. The aggregated task information update 800 also includes a plurality of task information updates 818, 820, and 822. The task information update 818 is for a task associated with a plurality of information items 818a, 818b, and 818c, the task information update 820 is for a task associated with a plurality of information items 820a and 820b, and the task information update 822 is for a task associated with an information item 822a. Each of the information items 818a, 818b, 818c, 820a, 820b, and 822a includes an entry that falls under each of the headings 802, 804, 806, 808, 810, 812, and 814. For example, entries in the information items that fall under the 'info provided by' heading 802 may include the provider of the information item and/or the provider affiliation of the provider of the information item, entries in the information items that fall under the 'date published' heading 804 may include the date the information item was received by or first sent out to the user group 300, entries in the information items that fall under the 'age' heading 806 may include the duration of time since the information item was received or first sent out to the user group 300, entries in the information items that fall under the 'information' heading 808 may include information provided with the information item (e.g., the details described above and/or other information related to the information item). Entries in the information items that fall under the 'details' heading 812 may include links to further details on the information items that may include web links, documents internal to the user group, and/or a variety of other detail information known in the art. Entries in the information items that fall under the 'tell me more' heading 814 may include additional information about the information items. Entries in the information items that fall under the 'share this' heading 816 may include links that allow a user to share the information item with other users within or outside of the user group. In an embodiment, the prioritization of the information items 818a, 818b, 818c, 820a, and 820b discussed above may be based on their feedback, outside data, and/or data in the entries in the information items such as, for example, the date published, age, information, and/or a variety of other information known in the art. In an embodiment, in the event the user 306a no longer wants to receive task information updates for a particular task, the task data in the task database 314 may be modified such that the user 306a is disassociated from that task and no longer receives task information updates for that task. In an embodiment, the information aggregation engine 320 may determine, for example, that an information item associated with a particular task has expired (e.g., has reached a predetermined age), and the information aggregation engine 320 may disassociate the information item from that task. As can be seen, information items and the tasks they are associated with are grouped such that a user does not have to determine which informants items are relevant to which tasks.

The method 400 then proceeds to block 424 where feedback is received from at least one user. After receiving the aggregated task information updates in block 422 of the method 400, the users may review each task and the information items associated with those tasks. For each information item, the user may provide feedback data (i.e., feedback for the information items from the user) through, for example, a user IHS, to the user communication engine 316, which then stores that feedback data in the feedback database 318 as feedback. In an embodiment, the feedback data may be positive feedback to indicate, for example, that an information item is good and/or relevant to the task is it associated with. In an embodiment, positive feedback that indicates that an information item is good and/or relevant to the task is it associated with may result in positive feedback for the information provider that provided that information item. In an embodiment, the feedback data may be negative feedback to indicate, for example, that an information item is not good and/or relevant to the task is it associated with. In an embodiment, negative feedback that indicates that an information item is not good and/or relevant to the task is it associated with may result in negative feedback for the information provider that provided that information item. In an embodiment, the positive and/or negative feedback may result in prioritization or de-prioritization of an information item relative to another information item or for an information provider relative to another information provider. For example, for multiple information items associated with a given task, information items with more positive feedback will be prioritized over information items with less positive or negative feedback, and information items from information providers that have more positive feedback will be prioritized over information items from information providers that have less positive or negative feedback. In addition, if an information items and/or information provider receives a predetermined amount of negative feedback, that information provider may be restricted from submitting information items to the user group 300. In this manner, information providers may develop 'feedback reputations' that may be used to prioritize and de-prioritize information items associated with a task. The feedback then may be accessed in subsequent uses of the method 400 to prioritize information items that are associated with a given task.

The feedback received at block 424 of the method 400 may also include implicit feedback data. For example, implicit positive feedback data may be generated and associated with a particular information item in response to the user selecting the particular information item to view (e.g., by selecting a link to the information item that includes a title and/or summary of the information item in order to view a full version of the information item) or in response to the user forwarding the particular information item to a customer or prospect. Either explicit and implicit feedback data may be weighted in order to appropriately prioritize the information items relative to each other. While a few examples of implicit feedback have been described, one of skill in the art will recognize that a variety of other implicit feedback will fall within the scope of the present disclosure.

Feedback data may also be compartmentalized based on, for example, attributes of users and/or the tasks those users are associated with. For example, a first user that is associated with a first task and a second user that is associated with a second task may provide feedback for the same information item. The feedback data provided by the first user may be given more weight than the feedback data provided by the second user in the event a third user that is associated with a third task is provided the information item and the third task is either similar to the first task or includes more common attributes with the first task than the second task.

A few examples of the method 400 will now be provided. In one embodiment, the method 400 is used to provide information to the user 306a. In a first use of the method 400, a first task information update is provided to the user 306a similarly as described above such that the user 306a receives a task information update such as, for example, the task information update 818 illustrated in FIG. 8, that is for a task that includes the plurality of information items 818a, 818b, and 818c. A second use of the method 400 results in the receiving of a first information item that is one of a plurality of information items received from the information providers 106, 108, and 110, and storing the first information item in the information database 310. Task data is then retrieved from the task database, and the task data includes a first task that is the task for which the first task information update was provided. The first task information update is then transformed into a second task information update by associating the first information item with the first task in response to determining that the first information item is related to at least one attribute associated with the first task. Thus, the task information update 818 is transformed into a new and different task information update by adding the first information item to the task information update and, in an embodiment, prioritizing the first information item relative to the information items 818a, 818b, and 818c that were previously provided with the task information update 818. The second task information update may then be provided to the user 306a in response to determining that the user 306a is still associated with the task.

In another embodiment, the method 400 is used to provide information to the user 306a. In a first use of the method 400, a first task information update that includes a first information item is provided to the user 306a similarly as described above such that the user 306a receives a task information update such as, for example, the task information update 818 illustrated in FIG. 8, that is for a task that includes the plurality of information items 818a, 818b, and 818c. A second use of the method 400 results in the receiving of a second information item that is one of a plurality of information items received from the information providers 106, 108, and 110, and storing the second information item in the information database 310. Task data is then retrieved from the task database, and the task data includes a first task that is the task for which the first task information update was provided. The first task information update is then transformed into a second task information update by associating the first information item and the second information item with the first task in response to determining that the first information item and the second information item are related to at least one attribute associated with the first task. Thus, the task information update 818 is transformed into a new and different task information update by adding the second information item to the task information update and, in an embodiment, prioritizing the first information item relative to the second information item and/or the previous information items 818a, 818b, and 818c that were previously provided with the task information update 818. The second task information update may then be provided to the user 306a in response to determining that the user 306a is still associated with the task.

In another embodiment, the method 400 is used to provide information to the user 306a. In a first use of the method 400, a first aggregated task information update that includes a plurality of tasks and a first information item associated with each of those tasks is provided to the user 306a similarly as described above such that the user 306a receives an aggregated task information update such as, for example, the aggregated task information update 800 illustrated in FIG. 8, that includes the task information updates 818, 820, and 822 with the plurality of information items 818a, 818b, 818c, 820a, 820b, and 822a. A second use of the method 400 results in the receiving of a second information item that is one of a plurality of information items received from the information providers 106, 108, and 110, and storing the second information item in the information database 310. Task data is then retrieved from the task database, and the task data includes a plurality of tasks that include a first task that the user 306a is associated with such as, for example, the task for which the task information update 818 was provided previously. The first aggregated task information update is then transformed into a second aggregated task information update by associating the first information item and the second information item with the first task in response to determining that the first information item and the second information item are related to at least one attribute associated with the first task. Thus, the aggregated task information update 800 is transformed into a new and different aggregated task information update by adding the second information item to the task information update in the aggregated task information update and, in an embodiment, prioritizing the first information item relative to the second information item and/or the previous information items 818*a*, 818*b*, and 818*c* that were previously provided with that task information update 818. The second aggregated task information update may then be provided to the user 306*a* in response to determining that the user 306*a* is still associated with the task.

In another embodiment, the task database that associates attributes with tasks and tasks with users may be used to automatically update user profiles with the tasks they are working on, and then the information items may be provided to the users based on their user profiles that include the up-to-date tasks they are working on.

Thus, a system and method to provide information updates to users has been described that associates information items with tasks and then provides those information items to users in response to determining that the users are associated with tasks. The system and method allow the distribution of information items to be managed in ways that are advantageous relative to conventional systems and methods, consolidates and prioritizes information items for a given task for each user in order to present the most relevant information items to the user, and provides aggregated task information updates to each user on a periodic basis to ensure that the users are not overwhelmed by a constant stream of information items. In one embodiment, the system and method may be used for salesperson users in a sales user group in order to provide each of the salesperson users consolidated and prioritized information items related to the sales opportunity tasks that the salesperson users are working on. In another embodiment, the system and method may be used for lawyer users in a lawyer user group in order to provide each of the lawyer users consolidated and prioritized information items related to the legal matter tasks that the lawyer users are working on. While examples have been provided, one of skill in the art will recognize many different applications of the system and method 400 that fall into the scope of the present disclosure.

The systems and methods of the present disclosure provide substantial benefits over conventional systems and methods. For example, sales professionals must leverage current and relevant information (from news sources, knowledge bases, etc.) to build an understanding of the needs and challenges faced by their customers and prospects, and the better the sales professional can demonstrate that they are familiar with the business needs and challenges faced by their customers and prospects, and that they are informed about the latest information related to those needs and challenges, the more credibility they earn with the customer or prospect, thereby increasing their chances of keeping the customer's business or earning the prospect's business.

Such sales professionals are often times very good at "relationship building" (for example, they may be great at playing golf with the customer) but may be very poor at consistently and proactively researching and acquiring the information discussed above. While over significant periods of time, often spanning years, a sales professional may gain experience with the information needs of a certain type of customer they deal with on a regular basis (e.g. their "niche")—which may be a focus area by industry, size/class of customer, product type sold to the customer, etc.—sales professionals are often faced with sales opportunities that do not fit their "typical" sales opportunity profile. In such situations, sales professionals may be at a loss for relevant information to most effectively understand, and/or demonstrate that they understand, the needs and challenges faced by the customer or prospect.

Even when sales professionals have developed a strong level of experience around a certain type of customer of prospect ("niche"), market and competitive forces consistently cause changes to the needs of such customers and prospects. This can make it challenging for sales professionals to maintain a current and relevant level of knowledge with respect to such customers and prospects.

Because sales professionals are often poor at actively researching and acquiring information, information is often provided to them by their sales organization in an effort to help them. However, it is difficult for the sales organization to determine the specific information needed by each sales person in the sales organization, particularly when that sales organization is large and includes many different sales professionals that may each be focused on different types of customers and prospects, and to deliver the relevant information to each sales person.

Conventionally, these sales organizations will provide all of the information they acquire to all of the sales persons in the sales organization. This results in "information overload" on the part of the sales person and the sales persons either don't have the time to process all of the information or become overwhelmed and don't process any of the information. Additionally, these sales organizations typically just collect and organize various types of information in a database (e.g. an Intranet site, a document management system, a hard drive, etc.), and struggle because their sales professionals do not take the proactive measures to go to these databases and retrieve the information.

Even when sales organizations are able to get relevant information about the sales opportunities a sales person is working on, the sales person may not recognize the relevance of the information received to the sales opportunities they are working on (e.g. they can't "connect the dots"). This may be because the relevance of the information to the sales opportunity may not be immediately apparent to the sales person (e.g. an insurance sales person may not make the connection between how a nuclear power plant leak in Japan may impact the insurance needs of a local power company in Ohio, or how the same nuclear power leak may impact fuel prices and ultimately the shipping costs of a local trucking company.) Therefore, unless a direct connection can be made between the information provided and the sales opportunities impacted by that information, the information may not be utilized by the sales persons in an optimal fashion.

The Internet has made access to information much easier. Information and news sites abound that aggregate information from various sources on behalf of individuals and deliver the information through newsletters, Web sites, RSS data feeds, etc. However, the information provided through the current technologies is limited in value for several reasons: Information is provided to users based on one or more profiles the users establish or someone establishes on their behalf, information is provided to users based on general demographic information about the user, and or information is provided to the user based on one or more groups or organizations the user belongs to. This current state of the art is limited in several ways. In a sales environment, information based on static profiles, demographic information, and/or group/organization membership can quickly become irrelevant as new sales opportunities are assigned to or selected by an individual and older sales opportunities are either earned or missed and therefore no longer assigned to the individual. Sales persons must constantly find relevant information to support their ability to work on the new sales opportunities. Individuals—especially sales professionals—typically do a very poor job of diligently keeping their profile, demographic and group membership information up to date, thereby limiting the amount of information they are provided that is relevant to the sales opportunities they are working on. Often times, even when the individual does see information that may be pertinent to a sales opportunity they are working on, they may not mentally associate the information with the sales opportunity, and therefore not take advantage of the information to benefit their performance with regards to the sales opportunity.

Furthermore, sales persons are often very protective and confidential/secretive about the sales opportunities they are working on. In many sales organizations, sales persons do not let their peers know about the sales opportunities they are working on for fear of the sales opportunities being poached by their peers. Therefore, it can be very difficult to provide sales professionals with information relevant to the sales opportunities they are working because those the sales persons will typically neglect to disclose most if not all of their sales opportunities.

The systems and methods of the present disclosure provide great advancement of the state of the art and effectiveness of sales persons and sales organizations by automatically matching relevant information with the sales opportunities that a sales person is working on, without the sales person having to manually maintain profiles, demographic information or other group/organization membership information that can quickly become outdated and/or disassociated with the sales opportunities the sales person is currently working on. Furthermore, the disclosed sales opportunities match this information to sales persons without disclosing to others the relevant sales opportunities, and communicate to the sales person which of their sales opportunities the information is relevant to.

Thus, a user that is associated with a plurality of tasks is provided with relevant information about those tasks. However, while it has been found that users find the relevant information provided to them through the system and method described above informative and useful, it has also been found that at least some users neglect to further expand their knowledge based on the relevant information. For example, in an ideal situation, a user would receive the information that is relevant to their tasks, develop questions about that information, and then seek out answers to their questions. In such situations, the users would then possess a multitude of knowledge that greatly benefits them in successfully working and/or completing their tasks. However, it has been found that users typically do not develop questions about the relevant information that is provided to them through the system and method described above, or in the event that they do develop questions, they do not seek out answers to those questions. A system and method are described below that remedy this situation by providing the users with the questions they should be asking about the relevant information they have received, and/or connecting the users to experts with which they can discuss those questions in order to develop the answers they need to help in working and/or completing their tasks.

Figure 9:
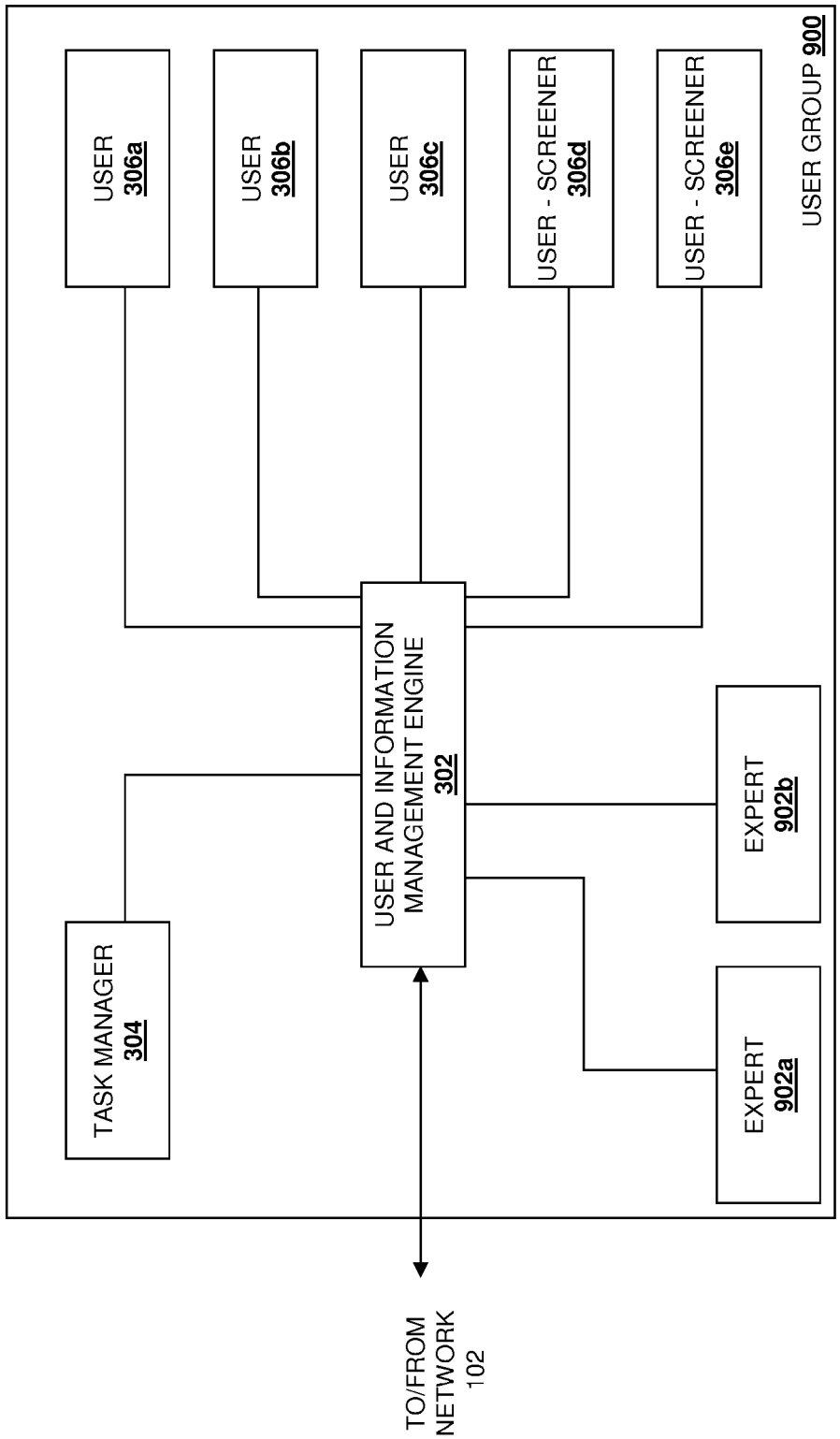
FIG. 9 is a schematic view illustrating an embodiment of the user group of FIG. 1.

Referring now to FIG. 9a, a user group 900, which may be the user group 104 described with reference to FIG. 1, is illustrated that is substantially similar to the user group 300, described above with reference to FIG. 3a, with the provision of a plurality of experts 902a and 902b that are coupled to the user and information management engine 302. While the experts 902a and 902b are illustrated in FIG. 9a as separate from the users 306a, 306b, and 306c and the user-screeners 306d and 306e, in some embodiments, users and/or user-screeners may be experts, and experts may be users and/or user-screeners, as described in further detail below. In an embodiment, the experts 902a and 902b may be sales people, supervisors of sales people, colleagues of sales people, lawyers, supervisors of lawyers, colleagues of lawyers, and/or a variety of other entities that qualify as experts on information related to the tasks to which the sales people, lawyers, and/or other users are assigned. In an embodiment, a user may be connected to one or more experts through an expert network that is associated with the user. For example, each user may be connected to a plurality of other users in business networks, friend networks, social networks, and/or a variety of other networks known in the art, and their expert network may include any of those users. In an embodiment, experts may be users that the system determines possess qualifications, attributes, and/or other characteristics that make that user an expert on a particular task, information item, discussion, and/or other subject known in the art. Thus, in some embodiments, a user may be an expert in some situations (e.g., with regard to a particular task, information item, discussion, or other subject) and that user may not be an expert in other situations. Thus, in one example, any of the users 306a-306e may include experts 902a and/or 902b in their expert network.

Figure 10:
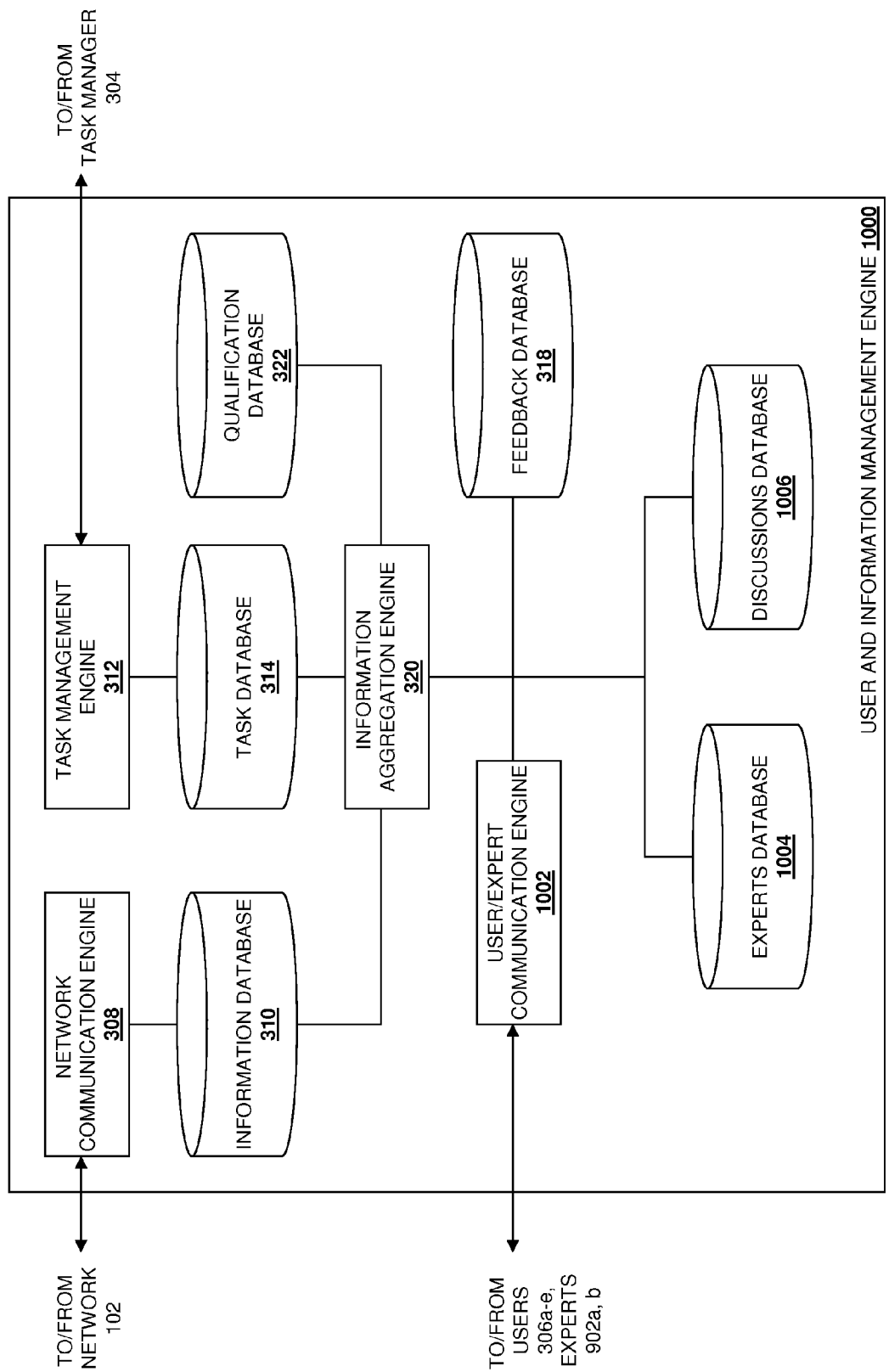
FIG. 10 is a schematic view illustrating an embodiment of a user and information management engine used in the user group of FIG. 9.
Figure 11A:
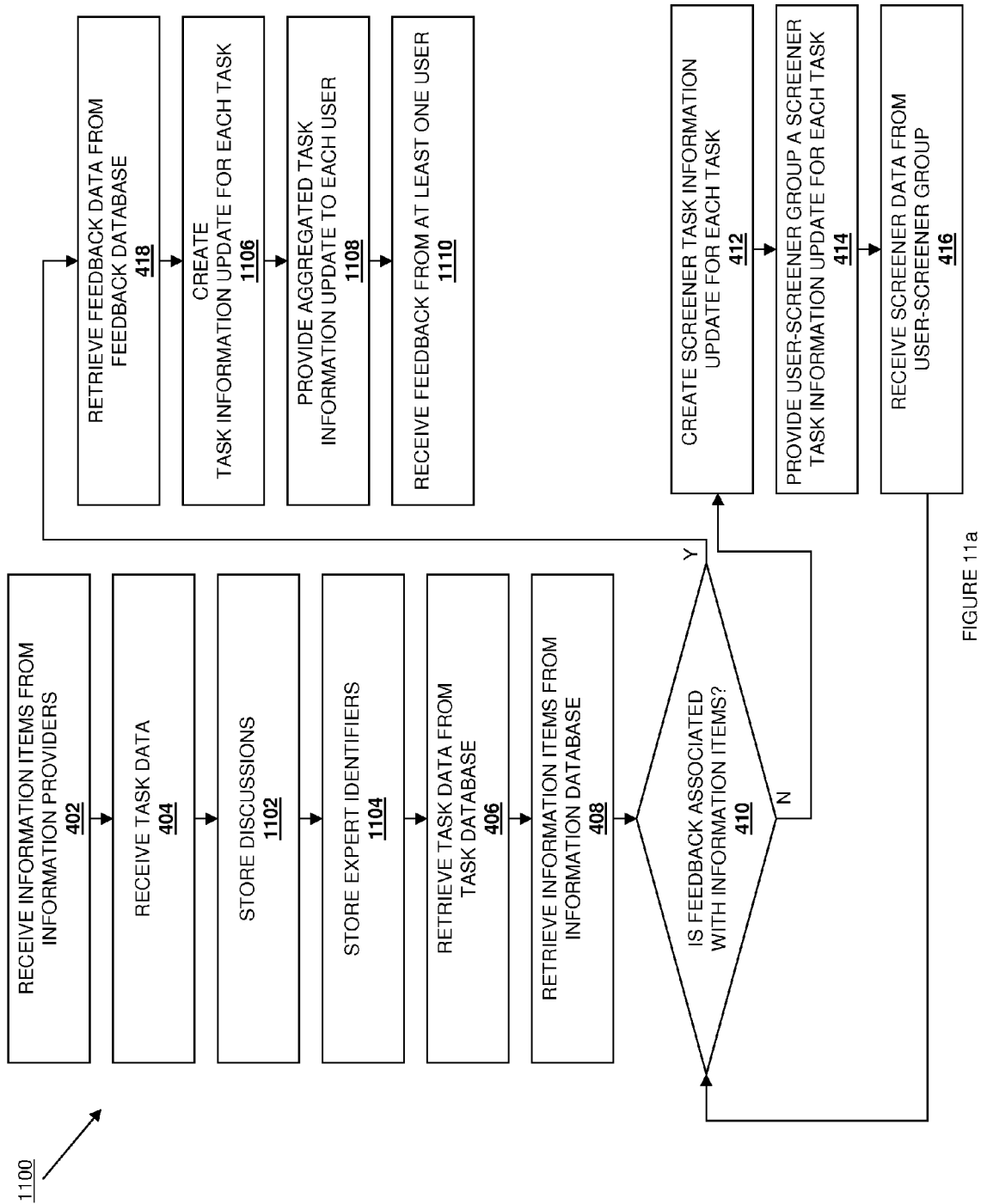
FIG. 11a is a flow chart illustrating an embodiment of a method to provide information and information experts to a user.
Figure 12:
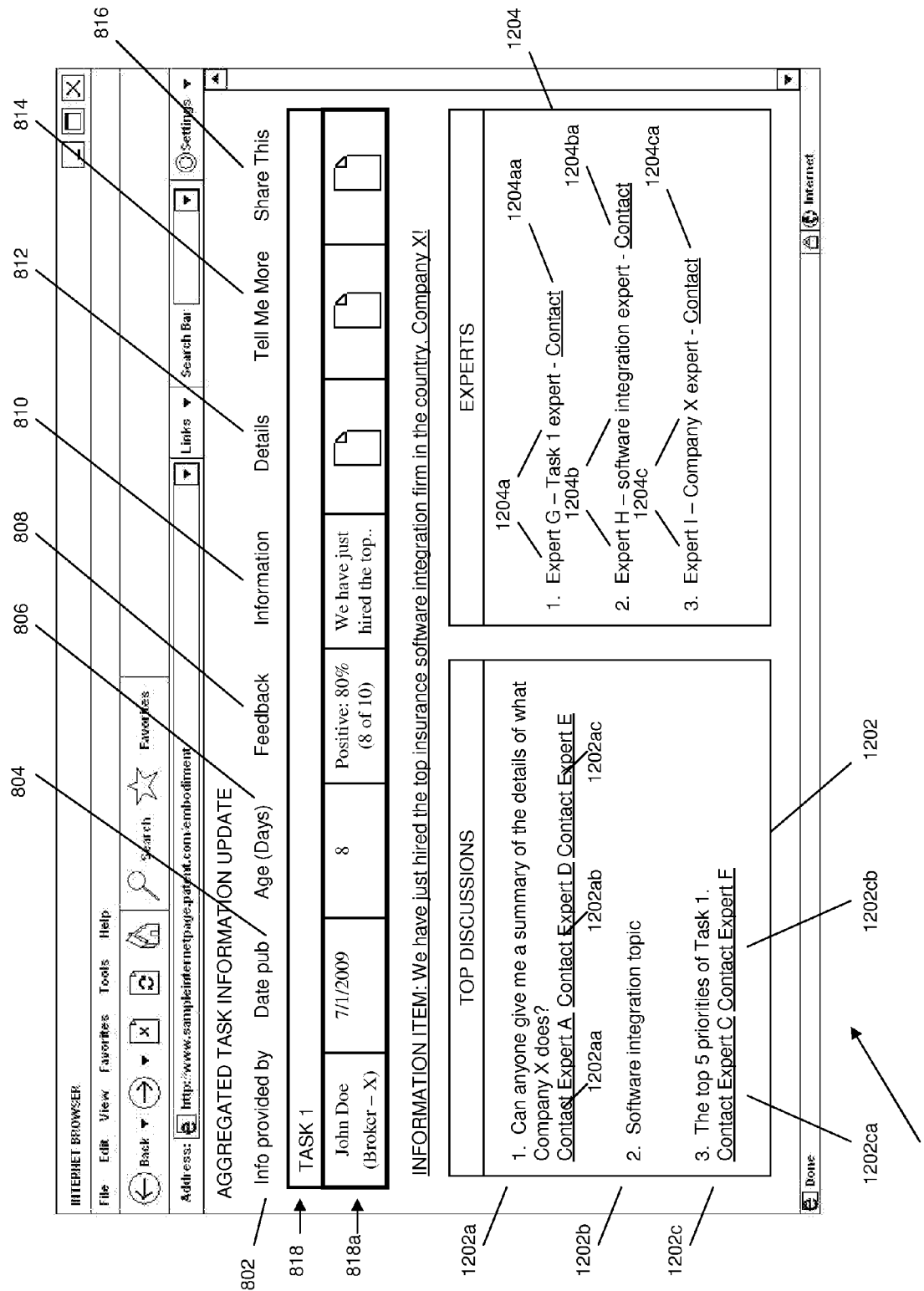
FIG. 12 is a screenshot illustrating an embodiment of an expanded aggregated task information update.

Referring now to FIG. 10, a user and information management engine 1000 is illustrated that is substantially similar to the user and information management engine 302, described above with reference to FIG. 3b, with the provision of a user/expert communication engine 1002 replacing the user communication engine 316, and an experts database 1004 and a discussions database 1006 coupled to the information aggregation engine 320 and the user/expert communication engine 1002. In an embodiment, the user/expert communication engine 1002 may be, for example, software stored on the computer-readable medium 210 in the IHS 200, and is coupled to the users 306a-e, the experts 902a and 902b, the information aggregation engine 320, the feedback database 318, the expert database 1004 and the discussions database 1006. In an embodiment, the experts database 1004 and the discussions database 1006 are conventional databases known in the art. In an embodiment, the expert database 1004 and the discussions database 1006 may be located outside the user and information management engine 1000 and may still be operably coupled to the user and information management engine 1000, the information aggregation engine 320, and the user/expert communication engine 1002. In an embodiment, the expert database 1004, the discussions database 1006 and/or the other databases 310, 314, 318, and 322 may be included in a single database. In an embodiment, the expert database 1004 and the discussions database 1006 each include a plurality of databases.

Referring now to FIGS. 1, 2, 9, 10, 11a, 11b, and 11c, a method 1100 to provide information items and information experts to a user is illustrated and is substantially similar to the method 400, described above with reference to FIG. 4, with the provision new blocks 1102 and 1104 (located between blocks 404 and 406 in the illustrated embodiment), block 1106 replacing block 420, block 1108 replacing block 422, and block 1110 replacing block 424. The method 1100 begins at block 402 where information items are received from information providers in block 402 in substantially the same manner as discussed above for the method 400. The method 1100 then proceeds to block 404 where task data is received in substantially the same manner as discussed above for the method 400.

The method 1100 then proceeds to block 1102 where discussions are stored. As discussed above, during the method 400, users in users groups are provided aggregated task information updates that include the tasks the user is associated with and information items that are relevant to those tasks. For any task or information item associated with a task information update, users may start a discussion. For example, a user may select the entry for an information item that falls under the 'share this' heading 816, illustrated in FIG. 8, to share the information item with other users within or outside of their user group. Such sharing of an information item may results in a discussion between users (e.g., the user that shared the information item, the user with which the information item was shared, users that are forwarded the discussion, users that searched and found the discussion, etc.) about the task, the information item, topics related to the task or information item, other information items related to the task or information item, etc. Furthermore, discussions may be developed about tasks, information items, and/or subjects related to tasks and information items independent of any sharing of the information item received in an aggregated task information update. For example, a group discussion may begin within a user group, across user groups, or outside of user groups on tasks, information items, and/or related information using methods known in the art (e.g., forums, discussion boards, email exchanges, etc.) Similarly, discussions may be started about any topic that is relevant to a business, sales person, sales opportunity, law firm, lawyer, client, etc. For example, administrators of the user and information management system 302 may provide or solicit discussions about general subject matter (e.g., attributes that are associated with tasks) in the system, and those discussions about general subject matter may be stored at block 1102.

At block 1102 of the method, any discussions occurring within a user group, across user groups, and/or outside user groups may be retrieved, filtered through, and/or otherwise received by the user/expert communication engine 1002 for storage. The user/expert communication engine 1002 may store the discussions in the discussion database 1006. In another embodiment, discussions may be 'stored' in the discussion database by storing a link to other identifier for the discussion such that the discussion may be linked to other otherwise retrieved. In an embodiment, discussions in the discussions database 1006 may be periodically reviewed by administrators using techniques such as keyword searching and/or a variety of other techniques known in the art to determine and categorize the subject matter of the discussions, and that information may be stored in the discussions database 1006 along with the discussions. In an embodiment, discussions about tasks and/or information items are facilitated through the user and information management engine 1000 using the discussions database such that they are immediately available to the user and information management engine 1000. In other embodiments, the user and information management engine 1000 retrieves the discussions from sources outside the user and information management engine 1000.

The method 1100 then proceeds to block 1104 where expert identifiers are stored. In an embodiment, the user/expert communication engine 1002 may store an expert identifier for one or more users in the system (or users connected to users in the system) in the experts database 1004. In an embodiment, the user/expert communication engine 1002 may query, filter, or otherwise review users (e.g., a user profile available to the user/expert communication engine 1002 may be reviewed) in the user group 900 or users connected to users in the user group 900 to determine user characteristics of those users that indicate subject matter for which that user may be considered an expert, and those user characteristics may be associated with expert identifiers in the expert database 1004. Expert characteristics may include, for example, education details, profession, publications, experience with a specific industry, a specific product, and/or a specific geographic location, and/or a variety of other expert characteristics known in the art. For example, an expert may have expert characteristics that includes experience with builders risk in construction (i.e., experience in a specific industry), experience in public company directors and officers liability insurance (i.e., a specific product type), experience in flood, fire, and earthquake insurance based on expertise of fault zones in California (i.e., experience in a specific geographic location), etc. Furthermore, discussions may be reviewed for user comments and the user comments may be characterized to determine whether the user making them is an expert on the various subject matter of the discussion, and information related to the review of the discussion may be associated with the expert identifier for the user in the expert database 1004. In an embodiment, user networks such as business networks, friend networks, social networks, and/or a variety of other networks known in the art may be reviewed to determine a plurality of experts with expert characteristics in those networks, and an expert identifier for those experts may be stored in the expert database 1004. For example, business networks, friend networks, and/or social networks may be mined for information to determine experts in particular subjects in order to be able to 'push' those experts to users in accordance with user needs. In an embodiment, block 1104 of the method 1100 results in each user being associated with an expert network, and each expert network associated with a user includes a plurality of experts that have expert characteristics and that are associated with their respective expert identifiers in the expert database 1004. In an embodiment, in order for an expert to be located in an expert network of a user, that expert must be linked to the user through some other network associated with that user (e.g., that users business networks, friend networks, social networks, etc.)

The method 1100 then proceeds to block 406 where task data is retrieved from the task database in substantially the same manner as discussed above for the method 400. The method 1100 then proceeds to block 408 where information items are retrieved from the information database in substantially the same manner as discussed above for the method 400. The method 1100 then proceeds to decision block 410 where it is determined whether feedback is associated the information items in substantially the same manner as discussed above for the method 400. If, at decision block 410, it is determined that feedback is not associated with the information items, the method 1100 proceeds to block 412 where a screener task information update is created for each task in substantially the same manner as discussed above for the method 400, block 414 where the screener task information update for each task is provided to a user-screener group in substantially the same manner as discussed above for the method 400, block 416 where screener data is received from the user-screener group in substantially the same manner as discussed above for the method 400, and then back to decision block 410. If, at decision block 410, it is determined that feedback is associated with the information items, the method 1100 proceeds to block 418 where feedback data is retrieved from the feedback database in substantially the same manner as discussed above for the method 400.

The method 1100 then proceeds to block 1106 where a task information update is created for each task in substantially the same manner as discussed above for the block 420 in the method 400, but with the provision of some additional steps. As discussed above with regard to block 420 in the method 400, the creation of the task information update for each task results in a plurality of information items being associated with each task, and those information items may be prioritized according to feedback. At decision block 1106a, illustrated in FIG. 11b, the information aggregation engine 320 reviews the task information update and, for each task in the task information update, determines whether there are discussions that are related to the task and/or the information items that are associated with that task in the task information update. In an embodiment, the information aggregation engine 320 may access the discussion database 1006 and, for example, using characteristics of the discussions that are stored in the discussion database 1006, the information aggregation engine 320 may determine whether there are any discussions that are related to the task due to the discussion characteristics matching the attributes of the task. Furthermore, the information aggregation engine 320 may access the discussion database 1006 and, for example, using characteristics of the discussions that are stored in the discussion database 1006, the information aggregation engine 320 may determine whether there are any discussions that are related to the information items due to the discussion characteristics indicating that the discussions are about the information items, the discussions are discussing information related or relevant to the information items, and/or that the discussions provide additional information about the information items.

If, at decision block 1106a, the information aggregation engine 320 determines that there are discussions that are related to a task or the information items associated with the task in a task information update, the information aggregation engine 320 may associate those discussions with the task information update. In an embodiment, discussions that are related to the task and/or information items in a task information update may be prioritized and/or ranked based on several factors. For example, discussion characteristics may be used to determine that one discussion is more relevant or related to a task or information item than other discussions, and thus that discussion may be prioritized and/or ranked higher than other discussions. Discussion characteristics may include details of a discussion that indicate that the discussion is related to a specific industry, a specific product, and/or a specific geographic location. In an embodiment, discussion details may be determined through a keyword search of the discussion and/or correlation of keywords to corresponding discussion terms. For example, a discussion may include the keyword 'construction' and thus be associated with construction as a discussion characteristic for an industry, or the discussion may include discussion terms indicative of the construction industry such as names and types of construction equipment (e.g., 'bulldozer', 'jackhammer', etc.) and those discussion terms may result in the discussion being associated with construction as a discussion characteristic. Furthermore, discussions that are determined to be similarly relevant or related to a task or information item based on their discussion characteristics may be distinguished from each other based on, for example, the quantity of information in the discussions, the number of users that are involved in the discussion that are also located in an expert or other network of a user receiving the task information update, feedback that is associated with the discussion (discussed in more detail with regard to block 1110), etc. In an embodiment, the number of discussions associated with a task or information item may be limited to predefined, maximum number of discussions.

If, at decision block 1106a, the information aggregation engine 320 determines that there are no discussions that are related to a task or the information items in a task information update, or upon associating related discussions with task information updates in block 1106b, the method 1100 proceeds to block 1108 where an aggregated task information update is provided to each user. At block 1108, an aggregated task information update is provided to each user in substantially the same manner as discussed above with regard to block 422 in the method 400, but with the provision of some additional steps. As discussed above, for each user, an aggregated task information update is provided that may include each task the user is associated with, information items that are relevant to those tasks, and discussions that are relevant to those tasks and/or information items. For example, the aggregated task information update may be 'pushed' to a user, having been created and tailored to that users interests according to the method 1100 (i.e., rather than requiring any action from those user to retrieve the aggregated task information update). Referring now to FIG. 11b, at decision block 1108a, for each user and their aggregated task information update, the information aggregation engine 320 determines whether there are experts related to the tasks, the information items related to the tasks in the task information updates, or the discussions that are associated with the task information updates. In the illustrated embodiment, the determination of experts related to tasks, information items, or discussions is performed on aggregated task information updates in order to determine whether related experts exist in an expert network associated with a user for whom the aggregated task information update was created. In other embodiments, the determination of experts related to tasks, information items, or discussions may be performed on each task information update (e.g., a task information update that is not specific to any particular user) such that any expert in the system may be associated with the task information update (e.g., in an embodiment where experts associated with task information updates do not need to be directly related to any user network of a user who receives the task information update.)

In an embodiment, the information aggregation engine 320 may access the expert database 1004 and, for example, using characteristics of the experts that are associated with expert identifiers and stored in the expert database 1004, the information aggregation engine 320 may determine whether there are any experts that are related to a task due to the expert characteristics matching the attributes of the task. Furthermore, the information aggregation engine 320 may access the expert database 1004 and, for example, using characteristics of the experts that are associated with expert identifiers and stored in the expert database 1004, the information aggregation engine 320 may determine whether there are any experts that are related to the information items due to the expert characteristics indicating that the experts have expertise about the information items. Furthermore, the information aggregation engine 320 may access the expert database 1004 and, for example, using characteristics of the experts that are associated with expert identifiers and stored in the expert database 1004, the information aggregation engine 320 may determine whether there are any experts that are related to the discussions due to the expert characteristics indicating that the have expertise about the discussion characteristics. Furthermore, users that have participated in discussions that were associated with the task information update in block 1106b of the method 1100 may be determined to be experts at decision block 1106c. For example, users that do not have expert characteristics explicitly declared for them may be determined to be experts based on their behaviors, such as participation in discussions (i.e., those users may be provided as experts for a topic based on their comments in a discussion about that topic) and ranked by the popularity of that participation (e.g., the number of views of the users comments in the discussion, the amount of time the users comments in a discussion have been viewed, etc.)

If, at decision block 1108a, the information aggregation engine 320 determines that there are experts that are related to a task, the information items associated with the task, or discussions associated with the task information updates in an aggregated task information update, the method 1100 proceeds to block 1108b where the information aggregation engine 320 associates those experts with the task information updates in the aggregated task information update for a user. (e.g., by associating expert identifiers with the task information update and/or the aggregated task information update.) In other embodiment, experts may be associated with task information updates prior to creating aggregated task information updates for specific users (as described above). In an embodiment, experts that are related to the task, information items, and/or discussions in a task information update may be prioritized and/or ranked based on several factors. For example, expert characteristics may be used to determine that one expert is more relevant or related to a task, information item, and/or discussion than other experts, and thus that expert may be prioritized and/or ranked higher than other experts. Furthermore, experts that are determined to be similarly relevant or related to a task, information item, or discussion may be distinguished from each other based on, for example, feedback that is associated with the expert (discussed in more detail with regard to block 1110), etc. In some embodiments, in the absence of direct feedback, user/expert participation in discussions and the popularity of that participation or those discussion (i.e., more users participating in discussions involving the expert, higher ranking by users reviewing or participating in discussions involving the expert, more users viewing the discussion or comments related to the discussion involving the expert, the amount of time users view discussions or comment in discussions involving the expert, etc.) may be used as "indirect feedback" for the user/expert and/or to rank the user/expert.

Furthermore, at block 1108, an aggregated task information update is provided to each user in substantially the same manner as discussed above with regard to block 422 in the method 400. In an embodiment, the aggregated task information update may look substantially similar to the aggregated task information update 800, illustrated in FIG. 8. However, in an embodiment, when a user that is provided the aggregated task information update 800 selects the information item 818a for the task information update 818, the user/expert communication engine 1002 may present the user with an expanded information item screen 1200 that includes a discussions section 1202 and an experts section 1204. The discussions section 1202 includes a plurality of discussions that were associated with the task information update 818 and/or the information item 818a at block 1106b of the method 1100. For example, the discussion section 1202 includes a discussion 1202a and a plurality of experts identifiers 1202aa, 1202ab, and 1202ac that were determined to be related to the discussion 1202a and that were associated with the task information update at block 1108b of the method 1100. The discussion section 1202 also includes a discussion topic 1202b. The discussion section 1202 also includes a discussion 1202c and a plurality of expert identifiers 1202ca and 1202cb that were determined to be related to the discussion 1202c and associated with the task information update at block 1108b of the method 1100.

In an embodiment, a user of the expanded information item screen 1200 may select any of the discussions 1202a, 1202b, and 1202c to read the contents of the discussion. Furthermore, a user of the expanded information item screen 1200 may select any of the expert identifiers 1202aa, 1202ab, and 1202ac to be provided contact information with which to ask a question of experts that have been determined to be experts on the subject matter of the discussion 1202a. Similarly, a user of the expanded information item screen 1200 may select the any of the expert identifiers 1202ca and 1202cb to be provided contact information with which to ask a question of experts that have been determined to be experts on the subject matter of the discussion 1202c.

Figure 13:
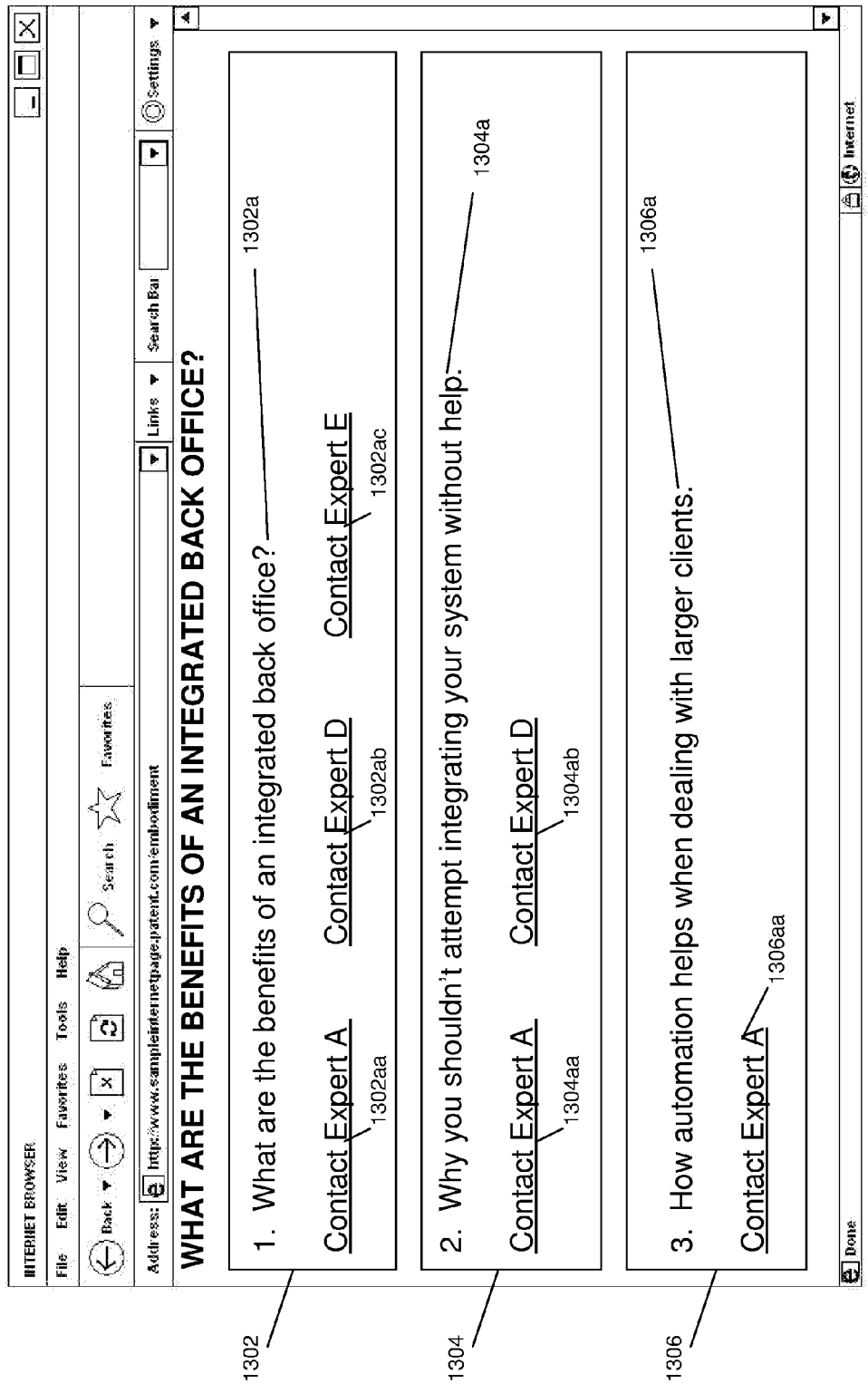
FIG. 13 is a screenshot illustrating an embodiment of a discussion topic screen.

Furthermore, a user of the expanded information item screen 1200 may select the discussion topic 1202b in order to be provided a discussion topic screen 1300, illustrated in FIG. 13. The discussion topic screen 1300 includes a plurality of discussion sections 1302, 1304, and 1306. The discussions sections 1302, 1304, and 1306 may include discussions that were associated with the task information update 818 and/or the information item 818a at block 1106b of the method 1100, or general subject matter discussions provided by the administrator of the system. For example, the discussion section 1302 includes a discussion 1302a and a plurality of expert identifiers 1302aa, 1302ab, and 1302ac that were determined to be related to the discussion 1302a, the discussion section 1304 includes a discussion 1304a and a plurality of expert identifiers 1304aa and 1304ab that were determined to be related to the discussion 1304a, and the discussion section 1306 includes a discussion 1306a and an expert identifier 1306aa that was determined to be related to the discussion 1306a. In an embodiment, a user of the discussion topic screen 1300 may select any of the discussions 1302a, 1304a, and 1306a to read the contents of the discussion. Furthermore, a user of the discussion topic screen 1300 may select any of the expert identifiers 1302aa, 1302ab, and 1302ac to be provided contact information with which to ask a question of experts that have been determined to be experts on the subject matter of the discussion 1302a. Similarly, a user of the discussion topic screen 1300 may select the any of the expert identifiers 1304aa and 1304ab to be provided contact information with which to ask a question of experts that have been determined to be experts on the subject matter of the discussion 1304a, and a user of the discussion topic screen 1300 may select the expert identifier 1306aa to be provided contact information with which to ask a question of expert that was determined to be an expert on the subject matter of the discussion 1306a.

The experts section 1204 includes a plurality of experts that were associated with the task information update 818 and/or the information item 818a at block 1108b of the method 1100. For example, the experts section 1204 includes a plurality of expert identifiers 1204a, 1204b, and 1204c that were determined to be related to the task and/or the information item 818a and associated with the task information update 818 at block 1108b of the method 1100. The experts section 1204 also includes a respective link 1204aa, 1204ba, and 1204ca as part of each expert identifier 1204a, 1204b, and 1204c that a user of the expanded information item screen 1200 may select to ask a question of experts that have been determined to be experts on the task (e.g., the link 1204aa of the expert identifier 1204a) and/or the subject matter of the information item 818a (e.g., the link 1204ba of the expert identifier 1204b and/or the link 1204ca of the expert identifier 1204c).

Thus, one of skill in the art will recognize that the system and method discussed above may create a aggregated task information update for each user in the system that includes a plurality of task information updates for each task, information items that are relevant to those tasks, discussions that are related to the task and/or the information items, and experts that are related to the task, information items, and/or discussions. Discussions and experts may be determined and/or ranked indirectly based on the popularity or participation in discussions as determined by, for example, the number of times a discussion or comment in the discussion is viewed or forwarded to another user, the amount of time users have spent viewing a discussion or comment, etc.

If, at decision block 1108*a*, the information aggregation engine 320 determines that there are no experts that are related to a task, the information items associated with the task, or discussion related to the task information updates in the aggregated task information updates, or upon associating related experts with task information updates in block 1108*b*, the aggregated task information updates are provided to the user as discussed above and the method 1100 proceeds to block 1110 where feedback is received from at least one user. In an embodiment, block 1110 operates in substantially the same manner as discussed above with regard to block 424 with the provision that feedback from the at least one user may also be received for discussion and/or experts. For example, a user may review any of the discussions 1202*a*, 1202*b*, and/or 1202*c* in the expanded information item screen 1200 and provide a rating of the discussion that is indicative of how helpful, relevant, and/or otherwise informative that discussion was to the user. In another example, upon contacting one of the experts associated with the expert identifiers 1202*aa*, 1202*ab*, 1202*ac*, 1202*ba*, 1202*ca*, 1202*cb*, 1204*a*, 1204*b*, and 1204*c*, to discuss the task, information items, and/or discussions, the user may provide a rating of the expert that is indicative of how helpful, relevant, and/or otherwise informative that expert was to the user. As discussed above with reference to blocks 410, 418, 1102, and 1104, feedback on discussions and/or experts that is provided by users may be used similarly as discussed above with feedback for information items in order to rank the discussions and/or experts, for example, when those discussions and/or experts are associated with task information updates and provided in the aggregated task information update 800 and/or the expanded information item screen 1200. Furthermore, feedback for discussions and/or experts may include implicit feedback data and/or may be compartmentalized similarly as described for feedback data on information items.

Thus, a system and method for providing information items and information experts to users has been described that tracks an association of users and tasks and, for each task, creates task information updates that include information items that are relevant to those task. Furthermore, for each task and/or information item, the system and method may provide discussions that are related to the task and/or information item. Further still, for each task, information item, and/or discussion, the system and method may provide expert identifiers that are associated with experts on the task, information items, and/or discussions, and the user of the task information update may select the expert identifiers to ask questions about the task, information item, and/or discussion. In an embodiment, the system and method may operate with little or no effort on behalf of the user, as the association of tasks and users may be managed by a task manager. Thus, users are regularly provided with an aggregated task information update that, for each task the user is involved with, provides the user with relevant information items, the questions (e.g., included in the discussions related to the task information update, the "Details" section 812 and/or the "Tell Me More" section 814 of the aggregated task information update 800, associated with experts related to the task information update, etc.) they should be asking about the task and/or information items, and the answers to those questions (e.g., answers obtainable from the experts related to the task, information items, and/or discussions.) Furthermore, experts provided to a user in a task information update may be experts that are included in a users expert network and thus will include other users in the system that the user has some connection with. This connection may further facilitate the question and answer exchange about the task, information items, and/or discussions, as a user is more likely to contact an other user in the system that they have a connection to (and the other user is more likely to respond to that user) relative to two users that are not connected in any way.

In one example, the system and method discussed above is performed in a sales situation where the user group includes a plurality of sales people (users). Each sales person is associated with a plurality of sales opportunities (tasks), and the system and method may include a task manager that monitors and updates the sales person/sales opportunity associations such that they are up to date. The system and method may then create aggregated task information updates as discussed above for each sales person and send those aggregated task information updates to each sales person at regular intervals (e.g., once a week). For example, the system and method may receive information items from businesses associated with the sales situation, news sources, and/or from a variety of other information providers known in the art. Then, for each sales opportunity, information items are associated with the sales opportunities in a task information update. For example, information items associated with the task information update may include a new product that is relevant to the sales opportunity, a news article that discusses one or more companies that are involved in the sales opportunity, an internal sales group release that is relevant to the sales opportunity, and/or a variety of other information items known in the art. The system and method may then associate a plurality of discussions with the task information updates. For example, discussions associated with the task information updates may include a discussion of the product associated with the task information update, a discussion of the news article associated with the task information update, a discussion of the internal sales group release associated with the task information update, and/or a variety of other discussions known in the art. The system and method may then associate a plurality of experts with the task information updates and/or the aggregated task information update. In an embodiment, upon creating the task information updates and using the task information updates to create the aggregated task information updates for each sales person, the system and method may use each aggregated task information update and its associated user to associate a plurality of experts with the aggregated task information update that are in an expert network with the associated sales person. For example, experts associated with the aggregated task information update may include users with expert characteristics related to one of the sales opportunities in the task information update, expert characteristics related to the information items relevant to those sales opportunities, expert characteristics related to discussions of the product relevant to the sales opportunities, the news article relevant to the sales opportunities, and/or the internal sales release relevant to the sales opportunities, and/or a variety of other experts known in the art. Thus, the sales persons are provided with information items relevant to their sales opportunities, the questions they should be asking about those information items, and the ability to contact experts in their user networks to obtain answers to those questions.

In another example, the system and method discussed above is performed in a legal situation where the user group includes a plurality of lawyers (users). Each lawyer is associated with a plurality of legal matters (tasks), and the system and method may include a task manager that monitors and updates the lawyer/legal matter associations such that they are up to date. The system and method may then create aggregated task information updates as discussed above for each lawyer and send those aggregated task information updates to each lawyer at regular intervals (e.g., once a week). For example, the system and method may receive information items from businesses associated with the legal matter, news sources, and/or from a variety of other information providers known in the art. Then, for each lawyer, information items are associated with the legal matter in a task information update. For example, information items associated with the task information update may include a legal decision that is relevant to the legal matter, a news article that discusses the development in one or more laws that are relevant to the legal matter, an internal law firm release that is relevant to the legal matter, and/or a variety of other information items known in the art. Furthermore, the system and method may then associate a plurality of discussions with the task information update. For example, discussions associated with the task information update may include a discussion of the legal decision associated with the task information update, a discussion of the development in the one or more laws associated with the task information update, a discussion of the internal law firm release associated with the task information update, and/or a variety of other discussions known in the art. The system and method may then associate a plurality of experts with the task information updates and/or aggregated task information update. In an embodiment, upon creating the task information updates and using the task information updates to create the aggregated task information updates for each lawyer, the system and method may use each aggregated task information update and its associated lawyer to associate a plurality of experts with the aggregated task information update that are in an expert network with the associated lawyer. For example, experts associated with the aggregated task information update may include users with expert characteristics related to one of the legal matters in the task information update, the legal decision, law development, and/or internal law firm release that is relevant to those clients, discussions of the legal decision, the law development, and/or the internal law firm release, and/or a variety of other experts known in the art. Thus, the lawyers are provided with information items relevant to their clients, the questions they should be asking about those information items, and the ability to contact experts in their user network to obtain answers to those questions.

While a few examples (sales persons, lawyers) have been provided that include specific implementations of the system and method for providing information items and information experts to users, a wide variety of implementations are envisioned as falling within the scope of the present disclosure, and one of skill in the art will recognize that these examples are not limiting and the system and method may be provided in a variety of situations.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A system to provide an information item and an information expert to a user, comprising:
    an information handling system (IHS) coupled to a network;
    an information database, a task database, and an expert database coupled to the IHS; and
    a computer-readable medium located in the IHS, the computer-readable medium comprising computer-readable instructions that, when executed by the IHS, cause the IHS to:
    receive an information item through the network from each of a plurality of information providers and store the information items in the information database, wherein the information items include a first information item;
    receive task data and store the task data in the task database, wherein the task data includes a plurality of tasks that are each associated with a different sales opportunity and include a first task and a second task, and at least one attribute that is associated with each of the plurality of tasks and that include at least one of a name of a company involved in the sales opportunity, a person in the company who may facilitate the sales opportunity, an industry operated in by a company for which the sales opportunity exists, a size of a company for which the sales opportunity exists, and a product sold by a company for which the sales opportunity exists;
    store a first expert identifier in the expert database, wherein the first expert identifier identifies a first expert that is associated with at least one of the first information item, the first task, and the second task;
    create a first task information update by associating the first information item with the first task in response to determining that the first information item is related to the at least one attribute associated with the first task;
    create a second task information update by associating the first information item with the second task in response to determining that the first information item is related to the at least one attribute associated with the second task;
    associate the first expert identifier with the first task information update in response to determining that the first expert is associated with the at least one of the first information item and the first task;
    provide, to a first user through a first user IHS over the network, the first task information update in response to determining that the first user is associated with the first task; and
    provide, to a second user through a second user IHS over the network, the second task information update in response to determining that the second user is associated with the second task.

2. The system of claim 1, further comprising:
    a discussion database coupled to the IHS, wherein the computer-readable medium further comprises computer-readable instructions that, when executed by the IHS, cause the IHS to:
    store a discussion in the discussion database; and
    associate the discussion with the first task information update in response to determining that the discussion is associated with at least one of the first information item and the first task.

3. The system of claim 2, wherein the computer-readable medium further comprises computer-readable instructions that, when executed by the IHS, cause the IHS to:

store a second expert identifier in the expert database, wherein the second expert identifier identifies a second expert that is associated with the discussion; and associate the second expert identifier with the first task information update in response to determining that the second expert is associated with the discussion.

4. The system of claim 1, wherein the first expert identifier is associated with the first task information update in response to determining both that the first expert is associated with least one of the first information item and the first task and that the first expert is in an expert network that is related to the first user.

5. The system of claim 1, wherein the computer-readable medium further comprises computer-readable instructions that, when executed by the IHS, cause the IHS to:

receive a selection of the first expert identifier from the first user through the first user IHS over the network;

provide contact information for the first expert to the first user through the first user IHS over the network;

receive feedback data from the first user through the first user IHS over the network, wherein the feedback data is related to the first expert; and associate the feedback data with the first expert identifier and store the feedback data in the expert database.

6. The system of claim 1, wherein the computer-readable medium further comprises computer-readable instructions that, when executed by the IHS, cause the IHS to:

store a second expert identifier in the expert database, wherein the second expert identifier identifies a second expert that is associated with at least one of the first information item and the first task;

create the first task information update by associating the first expert identifier and the second expert identifier with the first task information update in response to determining that the first expert and the second expert are each associated with least one of the first information item and the first task; and prioritizing the first expert identifier and the second expert identifier based upon first feedback data that is associated with the first expert and second feedback data that is associated with the second expert.

7. A method to provide an information item and an information expert to a user, comprising:

receiving a first information item through a network from an information provider and storing the first information item in an information database;

receiving task data and storing the task data in a task database, wherein the task data includes a plurality of tasks that are each associated with a different sales opportunity and that include a first task and a second task, and at least one attribute that is associated with each of the plurality of tasks and that includes at least one of a name of a company involved in the sales opportunity, a person in the company who may facilitate the sales opportunity, an industry operated in by a company for which the sales opportunity exists, a size of a company for which the sales opportunity exists, and a product sold by a company for which the sales opportunity exists;

storing a first expert identifier in an expert database, wherein the first expert identifier identifies a first expert that is associated with at least one of the first information item and the first task;

creating a first task information update by associating the first information item with the first task in response to determining that the first information item is related to the at least one attribute associated with the first task;

creating a second task information update by associating the first information item with the second task in response to determining that the first information item is related to the at least one attribute associated with the second task;

associating the first expert identifier with the first task information update in response to determining that the first expert is associated with the at least one of the first information item and the first task;

providing, to a first user through a first user IHS, the first task information update in response to determining that the first user is associated with the first task; and providing, to a second user through a second user IHS, the second task information update in response to determining that the second user is associated with the second task.

8. The method of claim 7, further comprising:

storing a discussion in a discussion database; and associating the discussion with the first task information update in response to determining that the discussion is associated with at least one of the first information item and the first task.

9. The method of claim 8, further comprising:

storing a second expert identifier in the expert database, wherein the second expert identifier identifies a second expert that is associated with the discussion; and associating the second expert identifier with the first task information update in response to determining that the second expert is associated with the discussion.

10. The method of claim 7, wherein the first expert identifier is associated with the first task information update in response to determining both that the first expert is associated with least one of the first information item and the first task and that the first expert is in an expert network that is related to the first user.

11. The method of claim 7, further comprising:

receiving a selection of the first expert identifier from the first user through the first user IHS over the network;

providing contact information for the first expert to the first user through the first user IHS over the network;

receiving feedback data from the first user through the first user IHS over the network, wherein the feedback data is related to the first expert; and associating the feedback data with the first expert identifier and storing the feedback data in the expert database.

12. The method of claim 7, further comprising:

storing a second expert identifier in the expert database, wherein the second expert identifier identifies a second expert that is associated with at least one of the first information item and the first task;

create the first task information update by associating the first expert identifier and the second expert identifier with the first task information update in response to determining that the first expert and the second expert are each associated with least one of the first information item and the first task; and prioritizing the first expert identifier and the second expert identifier based upon first feedback data that is associated with the first expert and second feedback data that is associated with the second expert.

13. A method to provide information items and information experts to a user, comprising:

receiving a first information item and a second information item through a network from at least one information provider and storing the first information item and the second information item in an information database;

storing a first expert identifier and a second expert identifier in an expert database;

retrieving the first information item and the second information item from the information database;

retrieving a plurality of task data from a task database, wherein the plurality of task data includes a plurality of tasks that are each associated with a different sales opportunity and that include a first task, a second task, a third task, and a fourth task, and at least one attribute that is associated with each of the plurality of tasks and that includes at least one of a name of a company involved in the sales opportunity, a person in the company who may facilitate the sales opportunity, an industry operated in by a company for which the sales opportunity exists, a size of a company for which the sales opportunity exists, and a product sold by a company for which the sales opportunity exists;

creating a first aggregated task information update by associating the first information item with the first task in response to determining that the first information item is related to the at least one attribute associated with the first task, and associating the second information item with the second task in response to determining that the second information item is related to the at least one attribute associated with the second task;

creating a second aggregated task information update by associating the first information item with the third task in response to determining that the first information item is related to the at least one attribute associated with the third task creating a third aggregated task information update by associating the second information item with the fourth task in response to determining that the second information item is related to the at least one attribute associated with the fourth task;

providing the first expert identifier in the first aggregated task information in response to determining that the first expert identifier identifies a first expert that is associated with at least one of the first information item and the first task;

providing the second expert identifier in the third aggregated task information in response to determining that the second expert identifier identifies a second expert that is associated with at least one of the second information item and the fourth task;

providing, to a first user through a first user IHS, the first aggregated task information update response to determining that the first user is associated with the first task and the second task;

providing, to a second user through a second user IHS, the second aggregated task information update response to determining that the second user is associated with the third task; and providing, to a third user through a third user IHS, the third aggregated task information update response to determining that the third user is associated with the fourth task.

14. The method of claim 13, further comprising:

storing a first discussion and a second discussion in a discussion database;

providing the first discussion and the second discussion with the first aggregated task information update in response to determining that the first discussion is associated with at least one of the first information item and the first task and the second discussion is associated with at least one of the second information item and the second task; and providing at least one of the first discussion and the second discussion with the second aggregated task information update in response to determining that the at least one of the first discussion and the second discussion is associated with at least one of the second information item and the fourth task.

15. The method of claim 14, further comprising:

storing a third expert identifier and a fourth expert identifier in the expert database;

providing the third expert identifier with the first aggregated task information update in response to determining that the third expert identifier identifies a third expert that is associated with the first discussion; and providing the fourth expert identifier with the first aggregated task information update in response to determining that the fourth expert identifier identifies a fourth expert that is associated with the second discussion.

16. The method of claim 13, wherein the first expert identifier is associated with the first aggregated task information update in response to determining both that the first expert is associated with least one of the first information item and the first task and that the first expert is in an expert network that is related to the first user, and wherein the second expert identifier is associated with the third aggregated task information update in response to determining both that the second expert is associated with least one of the second information item and the fourth task and that the second expert is in the expert network that is related to the third user.

17. The method of claim 13, further comprising:

receiving a selection of the first expert identifier from the first user through the first user IHS over the network;

providing contact information for the first expert to the first user through the first user IHS over the network;

receiving a selection of the second expert identifier from the third user through the third user IHS over the network; and providing contact information for the second expert to the thirluser through the third user IHS over the network;

receiving first feedback data from the first user through the first user IHS over the network, wherein the first feedback data is related to the first expert;

receiving second feedback data from the third user through the third user IHS over the network, wherein the second feedback data is related to the second expert; and associating the first feedback data with the first expert identifier and the second feedback data with the second expert identifier and storing the first feedback data and the second feedback data in the expert database.

* * * * *